US008828336B2

(12) United States Patent
Hadwen et al.

(10) Patent No.: US 8,828,336 B2
(45) Date of Patent: Sep. 9, 2014

(54) ACTIVE MATRIX DEVICE

(75) Inventors: Benjamin James Hadwen, Oxford (GB); Adrian Marc Simon Jacobs, Reading (GB); Jason Roderick Hector, Oxford (GB)

(73) Assignee: Sharp Kabushiki Kaisha, Osaka (JP)

( * ) Notice: Subject to any disclaimer, the term of this patent is extended or adjusted under 35 U.S.C. 154(b) by 783 days.

(21) Appl. No.: 13/019,368

(22) Filed: Feb. 2, 2011

(65) Prior Publication Data

US 2012/0194492 A1 Aug. 2, 2012

(51) Int. Cl.
*G09G 5/00* (2006.01)
*G02F 1/00* (2006.01)
*B01L 3/00* (2006.01)
*G09G 3/36* (2006.01)
*G06F 3/044* (2006.01)
*G09G 3/34* (2006.01)

(52) U.S. Cl.
CPC ............ *B01L 3/502792* (2013.01); *G02F 1/00* (2013.01); *B01L 2300/0816* (2013.01); *B01L 2400/0427* (2013.01); *B01L 2300/0887* (2013.01); *G09G 2300/08* (2013.01); *G09G 3/3648* (2013.01); *G06F 3/044* (2013.01); *B01L 2200/143* (2013.01); *B01L 2200/0673* (2013.01); *B01L 3/50273* (2013.01); *G09G 3/348* (2013.01)
USPC ............. 422/504; 422/518; 345/87; 345/104; 345/214; 324/649

(58) Field of Classification Search
None
See application file for complete search history.

(56) References Cited

U.S. PATENT DOCUMENTS 6,565,727 B1 5/2003 Shenderov
6,911,132 B2 6/2005 Pamula et al.
7,163,612 B2 1/2007 Sterling et al.

FOREIGN PATENT DOCUMENTS

WO 2008/101194 A2 8/2008
WO 2008/117210 A1 10/2008

OTHER PUBLICATIONS

R.B. Fair, "Digital microfluidics: is a true lab-on-a-chip possible?", Microfluid Nanofluid (2007), 3 ; pp. 245-281.
Srinivasan et al., "An integrated digital microfluidic lab-on-a-chip for clinical diagnostics on human physiological fluids", Lab Chip, 2004, 4, pp. 310-315.
Ren et al., "Automated on-chip droplet dispensing with volume control by electro-wetting actuation and capacitance metering", Sensors and Actuators B, vol. 98 (2004), pp. 319-327.

(Continued)

*Primary Examiner* — Jill Warden
*Assistant Examiner* — Timothy G Kingan
(74) *Attorney, Agent, or Firm* — Renner, Otto, Boisselle & Sklar, LLP

(57) ABSTRACT

An active matrix device is provided which includes N array elements arranged spatially in a sequence of first through Nth array elements (where N is an integer ≥2); the N array elements each including a write input for receiving a corresponding write input signal which controls operation of the array element, and a sense circuit for sensing a property of the array element and providing a sensor output based on the sensed property; and further including a manipulation circuit including logic circuitry connecting the sensor output from an nth array element in the sequence directly to the write input of an (n+1)th array element and configured to provide the write input signal to the write input of the (n+1)th array element based on the sensor output from the nth array element.

23 Claims, 29 Drawing Sheets

(56) References Cited

OTHER PUBLICATIONS

Brown et al., "A Continuous Grain Silicon System LCD with Optical Input Function", IEEE Jounral of Solid State Circuits, vol. 42, Issue 12, Dec. 2007, pp. 2904-2912.

Hunt et al., "Integrated circuit/microfluidic chip to programmably trap and move cells and droplets with dielectrophoresis", Lab Chip, 2008, 8, pp. 81-87.

European Search Report for corresponding European Application No. 12153318.6 dated Jun. 5, 2011.

ACTIVE MATRIX DEVICE

TECHNICAL FIELD

This invention finds application to the field of digital microfluidics and more specifically to active matrix electrowetting-on-dielectric (AM-EWOD). Electrowetting-On-Dielectric (EWOD) is a known technique for manipulating droplets of fluid on an array. AM-EWOD refers to implementation of EWOD in an active matrix array, for example by using thin film transistors (TFTs). The invention further relates to methods of driving such a device.

BACKGROUND ART

Electrowetting on dielectric (EWOD) is a well known technique for manipulating droplets of fluid by application of an electric field. It is thus a candidate technology for digital microfluidics for lab-on-a-chip technology. An introduction the basic principles of the technology" can be found in ("Digital microfluidics: is a true lab-on-a-chip possible?", R. B. Fair, Microfluid Nanofluid (2007) 3:245-281).

U.S. Pat. No. 6,565,727 (A. Shenderov; issued May 20, 2003) discloses a passive matrix EWOD device for moving droplets through an array.

U.S. Pat. No. 6,911,132 (Pamula et al, issued Jun. 28, 2005) discloses a two dimensional EWOD array to control the position and movement of droplets in two dimensions.

EWOD devices have been identified as a promising platform for Lab-on-a-chip (LoaC) technology. LoaC technology is concerned with devices which seek to integrate a number of chemical or biochemical laboratory functions onto a single microscopic device. There exists a broad range of potential applications of this technology in areas such as healthcare, energy and material synthesis. Examples include bodily fluid analysis for point-of-care diagnostics, drug synthesis, proteomics, etc.

Thin film electronics based on thin film transistors (TFTs) is a very well known technology which can be used, for example, in controlling Liquid Crystal (LC) displays.

Many modern displays use an Active Matrix (AM) arrangement whereby a switch transistor is provided in each pixel of the display. Such displays often also incorporate integrated driver circuits to supply voltage pulses to the row and column lines (and thus program voltages to the pixels in an array). These are realised in thin film electronics and integrated onto the TFT substrate.

U.S. Pat. No. 7,163,612 (J. Sterling et al.; issued Jan. 16, 2007) describes how TFT based electronics may be used to control the addressing of voltage pulses to an EWOD array by using circuit arrangements very similar to those employed in AM display technologies. Such an approach may be termed "Active Matrix Electrowetting on Dielectric" (AM-EWOD).

When performing droplet operations it is in general very useful to have some means of sensing droplet position, size and constitution. This can be implemented by a number of means. For example an optical means of sensing may be implemented by observing droplet positions using a microscope. A method of optical detection using LEDs and photosensors attached to the EWOD substrate is described in Lab Chip, 2004, 4, 310-315. U.S. Pat. No. 7,163,612 (J. Sterling et al.; issued Jan. 16, 2007) noted above also describes how TFT-based sensor circuits may be used with an AM-EWOD, e.g. to determine drop position. In the arrangement described there are two TFT substrates, the lower one being used to control the EWOD voltages, and the top substrate being used to perform a sensor function.

Sensors and Actuators B, Vol. 98 (2004) pages 319-327 describes a method for measuring droplet impedance by connecting external PCB electronics to an electrode in an EWOD array. However a disadvantage of this method is that the number of array elements at which impedance can be sensed is limited by the number of connections that can be supplied to the device. Furthermore this is not an integrated solution with external sensor electronics being required. This paper also describes how measured impedance can be used to meter the size of droplets and how droplet metering can be used to accurately control the quantities of reagents of chemical or biochemical reactions performed using an EWOD device. Impedance measurements at one or more locations could also be used for any of the following:

Monitor the position of droplets within an array.
Determining the position of droplets within the array as a means of verifying the correct implementation of any of the previously droplet operations.
Measuring droplet impedance to determine information regarding drop constitution, e.g. conductivity.
Measuring droplet impedance characteristics to detect or quantify a chemical or biochemical reaction.

It is also known that optical means of sensing can be implemented onto a TFT substrate, for example as described in "A Continuous Grain Silicon System LCD with Optical Input Function", Brown et al. IEEE Journal of Solid State Circuits, Vol. 42, Issue 12, December 2007 pp 2904-2912. The same reference also describes how sensor driver circuits and output amplifiers for the readout of sensor data can also be integrated onto the same TFT substrate.

Other modes of sensing integrated within a TFT substrate are also known. For example WO 2008/117210 (D. Fish et al.; published Oct. 2, 2008) describes a means of integrating thermal sensors in a TFT substrate.

Digital microfluidics can also be implemented using technologies other than EWOD. For example dielectrophoresis is a technique which may be used, as described in Thomas P Hunt et al, Lab Chip, 2008, 8, 81-87 which describes a silicon integrated circuit (IC) backplane to drive a dielectrophoresis array for digital microfluidics.

In the prior art systems described above, it is possible to implement feedback between a sensor function and a droplet control function. Such systems require some external means of processing sensor data in order to determine the subsequent control data to be written to the device. The provision of such external means (e.g. additional electronic circuitry, a computer etc) has disadvantages in that it adds cost and complexity to the overall system and may result in increased overall system power consumption. A further disadvantage is that feedback may be slower, since time is required to readout and process sensor data, and determine and write the subsequent control signals.

SUMMARY OF INVENTION

A fundamental aspect of the invention is an AM-EWOD device where at least some of the array elements contain:

A means for writing an AM-EWOD voltage, controlled by at least one write input signal
A means for sensing a droplet property (e.g. impedance), generating at least one sensor output
An individual array element is connected to one or more adjacent elements in such a way that the sensor output of the array element is used to (at least in part) determine the write input signal of the adjacent array elements.

The advantages of including localized feedback from the sensor function of one array element to the write function of one or more adjacent elements include as follows Feedback can be performed very rapidly. Using the sensor function to trigger the write function of neighboring array elements can thus maximize the speed of transfer of a droplet through an array Feedback can be performed very efficiently. By implementing the means of feedback locally, the requirements for off-chip processing of sensor data in order to perform feedback are reduced, or are nil.

According to certain embodiments of the invention, system power consumption can be made very low. The system can be configured such that only array elements in immediate proximity to droplet locations need be "awake" and consuming significant power.

According to certain embodiments of the invention, more complex functionality is possible using entirely integrated functionality, for example:

According to a measured quantity determined by the sensor, a decision is made regarding the pathway subsequently followed by the droplet.

According to a measured quantity determined by the sensor, errors can be detected (e.g. when a droplet transfer does not happen as intended) and corrected for locally.

Other advantages are described in the description of the individual embodiments.

According to an aspect of the invention, an active matrix device is provided which includes N array elements arranged spatially in a sequence of first through Nth array elements (where N is an integer ≥2); the N array elements each including a write input for receiving a corresponding write input signal which controls operation of the array element, and a sense circuit for sensing a property of the array element and providing a sensor output based on the sensed property; and further including a manipulation circuit including logic circuitry connecting the sensor output from an nth array element in the sequence directly to the write input of an (n+1)th array element and configured to provide the write input signal to the write input of the (n+1)th array element based on the sensor output from the nth array element.

According to another aspect, each of the array elements is a hydrophobic cell having a surface of which the hydrophobicity is controlled by the application of the corresponding write input signal, and the property sensed by the sense circuits is a property associated with a droplet being present in the respective array element.

In accordance with another aspect, the property includes an impedance of the droplet.

According to still another aspect, the sensor output of the nth array element indicating the droplet is present in the nth array element, the logic circuitry is configured to provide the write input signal to the (n+1)th array element to change the hydrophobicity of the (n+1)th array element.

In accordance with another aspect, the droplet is initially present at the first array element the logic circuitry provides the write input signals to the remaining array elements in the sequence to cause the droplet to move along the sequence of array elements.

According to another aspect, the logic circuitry is configured to sequentially provide the write input signals to the remaining array element in the sequence so that at any moment in time two or more adjacent array elements are in a state to receive or retain the droplet.

With still another aspect, the manipulation circuit includes additional logic circuitry connecting the sensor output of the nth array element directly to the write input of the nth array element to return the nth array element to a previous status following a change in the sensor output of the nth array element.

In yet another aspect, the logic circuitry includes an AND gate and an inverter associated with each of the array elements, the sensor output of an nth array element is connected to a first input of the AND gate associated with an (n+1)th array element and to an input of the inverter associated with the nth array element, and an output of the inverter associated with the nth array element is connected to a second input of the AND gate associated with the (n+1)th array element.

In accordance with another aspect, the logic circuitry includes an AND gate, an OR gate and an inverter associated with each of the array elements, the sensor output of an nth array element is connected to a first input of an OR gate associated with an (n+1)th array element and to a second input of an OR gate associated with the nth array element, an output of the OR gate associated with the nth array element is connected to a first input of the AND gate associated with the nth array element, an input of the inverter associated with the nth array element is connected to the sensor output of the (n+2)th array element, an output of the inverter associated with the nth array element is connected to a second input of the AND gate associated with the nth array element, and an output of the AND gate associated with the nth array element is connected to the write input of the nth array element.

According to another aspect, the logic circuitry is configured to provide write input signals to the array elements in the sequence to cause a droplet to split among the array elements.

According to yet another aspect, the logic circuitry is configured to provide write input signals to the array elements in the sequence to cause droplets amongst the array elements to merge or mix.

In accordance with still another aspect, the logic circuitry is configured to provide write input signals to the array elements in the sequence to cause a droplet to be eluted from a reservoir.

With yet another aspect, the array elements include a reset input for initiating a reset operation.

According to another aspect, the array elements include a power down input for initiating a low power consumption state.

In still another aspect, a sensor output of an array element earlier in the sequence is coupled to a power down input of a subsequent array element in the sequence, a change in the sensor output of the array element earlier in the sequence causing the subsequent array element in the sequence to awake from the low power consumption state.

According to another aspect, an additional array element spatially adjacent an nth array element in the sequence is provided, and the manipulating circuit includes additional logic circuitry configured to selectively provide write input signals to the (n+1)th array element and the additional array element in accordance with a predefined analysis function.

In accordance with another aspect, the additional logic circuitry includes a timer control circuit and the predefined analysis function incorporates a timeout condition.

According to another aspect, at least the first array element includes an initialization circuit to initialize the write input of the first array element.

In accordance with yet another aspect, the sense circuit utilizes at least one of impedance sensing, optical sensing or thermal sensing to sense the property of the array element.

According to another aspect, multiple sets of the N array elements each including a corresponding manipulation circuit are included.

According to still another aspect, the multiple sets of N array elements are arranged to effect control of multiple droplets simultaneously.

According to another aspect, the multiple sets of N array elements are arranged to effect control of a droplet which spatially extends over multiple array elements simultaneously.

In still another aspect, the multiple sets of N array elements are arranged to effect control of a droplet in series.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

Figure 1:
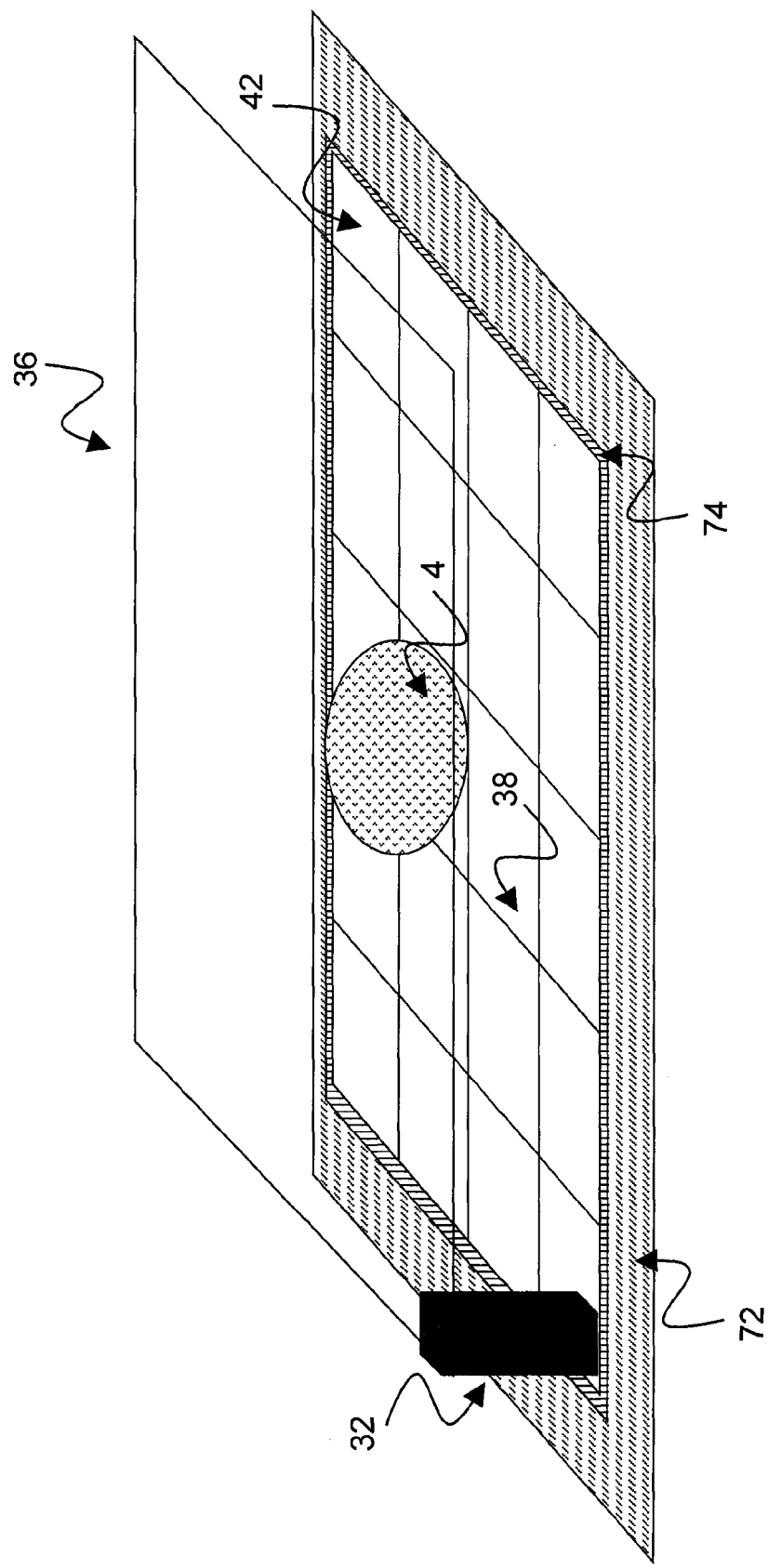
FIG. 1 shows an AM-EWOD device in accordance with the present invention.

DESCRIPTION OF REFERENCE NUMERALS 4 liquid droplet
6 contact angle θ
16 Hydrophobic surface
20 Insulator layer
26 Hydrophobic layer
28 Electrode
32 Spacer
34 Non-ionic liquid
36 Top substrate
38 Electrode
42 Electrode array
52 Droplet is present
53 No droplet is present
54 Capacitor
58 Capacitor $C_S$
60 Counter-substrate
68 Switch transistor
72 Lower substrate
74 Thin film electronics
76 Row driver circuit
78 Column driver circuit
80 Serial interface
82 Connecting wires 84 Array element circuit
94 Transistor
102 Sense node
146 Capacitor $C_C$
147 Diode
148 Diode
154 Load element $C_L$
160 Droplet manipulation circuit
162 Analogue switch
164 Analogue switch
166 Initialisation circuit
180 OR gate
182 OR gate
184 OR gate
202 First array element
203 First array element
204 Second array element
205 Second array element
206 Third array element
207 Third array element
208 Fourth array element
209 Transistor
219 Fourth array element
220 Three dot
222 AND gate
224 AND gate
225 AND gate
226 Inverter
228 Inverter
230 Inverter
231 Inverter
234 Level shifter
235 Array element
236 EW write and sense circuit
238 Bias and sample circuit
239 Modified bias and sample circuit
240 Digitization and latch circuit
242 Sensor data processing circuit
243 Logic reset circuit
244 First array element
245 Logic circuit
246 Second array element
247 Comparator
248 Third array element
249 First array element
252 AND gate
253 Analogue buffer circuit
260 Timer control circuit
262 OR gate
264 Array element A
265 Arrow
266 Array element B
268 Array element C
270 Array element D
272 Array element E
306 Transistor
308 Capacitor
408 Transistor
460 Flip-flop
462 Counter
464 AND gate
466 OR gate
468 Sensor enable switch transistor
470 SRAM cell

DETAILED DESCRIPTION OF INVENTION

Referring initially to FIG. 1, shown is an AM-EWOD device in accordance with a first embodiment of the present invention. The AM-EWOD device has a lower substrate 72 with thin film electronics 74 disposed upon the lower substrate 72. The thin film electronics 74 are arranged to drive array element electrodes, e.g. 38. A plurality of electrodes 38 are arranged in an electrode array 42, having M×N elements where M and N may be any number.

Figure 2:
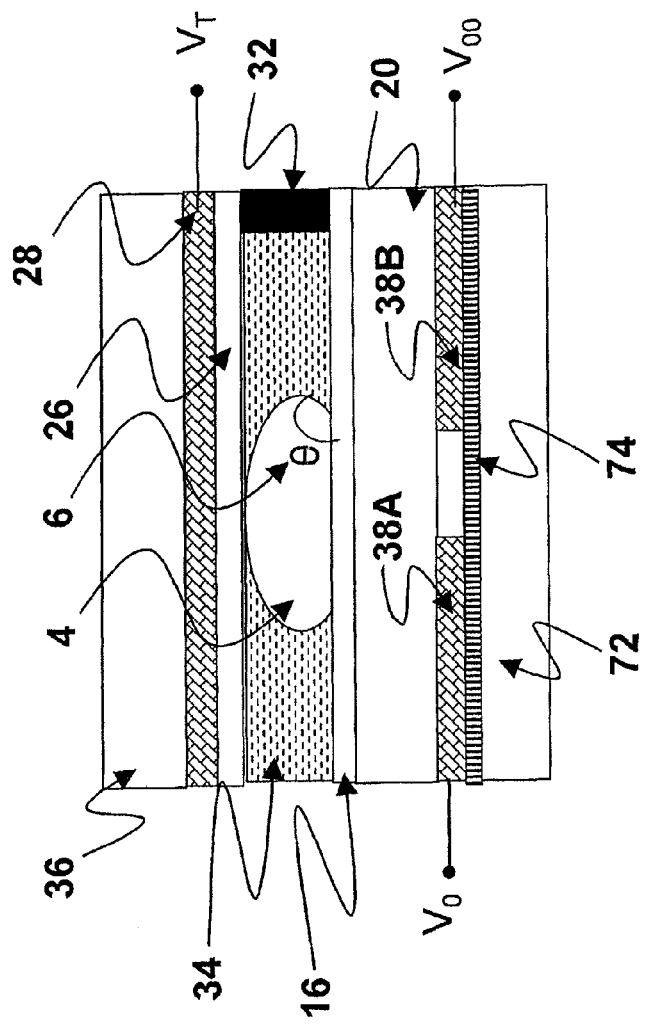
FIG. 2 shows a cross section through some of the array elements of the device.

A droplet 4 is enclosed between the substrate 72 and the top substrate 36, although it will be appreciated that multiple droplets 4 can be present without departing from the scope of the invention. FIG. 2 shows array elements in cross section. The device includes the lower substrate 72 having the thin-film electronics 74 disposed thereon. An uppermost layer of the lower substrate 72 (which may be considered a part of the thin film electronics layer 74) is patterned so that a plurality of electrodes 38 (e.g., 38A and 38B) are realised. These may be termed the EW drive elements. The term EW drive element may be taken in what follows to refer both to the electrode 38 associated with a particular array element, and also to the node of an electrical circuit directly connected to this electrode 38. The droplet 4, consisting of an ionic material is constrained in a plane between the lower substrate 72 and the top substrate 36. A suitable gap between the two substrates may be realised by means of a spacer 32, and a non-ionic liquid 34 (e.g. oil) may be used to occupy the volume not occupied by the droplet 4. An insulator layer 20 disposed upon the lower substrate 72 separates the conductive electrodes 38A, 38B from a hydrophobic surface 16 upon which the droplet 4 sits with a contact angle 6 represented by θ. On the top substrate 36 is another hydrophobic layer 26 with which the droplet 4 may come into contact. Interposed between the top substrate 36 and the hydrophobic layer 26 is a top substrate electrode 28. By appropriate design and operation of the thin film electronics 74, different voltages, termed the EW drive voltages, (e.g. $V_T$, $V_0$ and $V_{00}$) may be applied to different electrodes (e.g. drive element electrodes 28, 38A and 38B, respectively). The hydrophobicity of the hydrophobic surface 16 can thus be controlled, thus facilitating droplet movement in the lateral plane between the two substrates 72 and 36.

Figure 3:
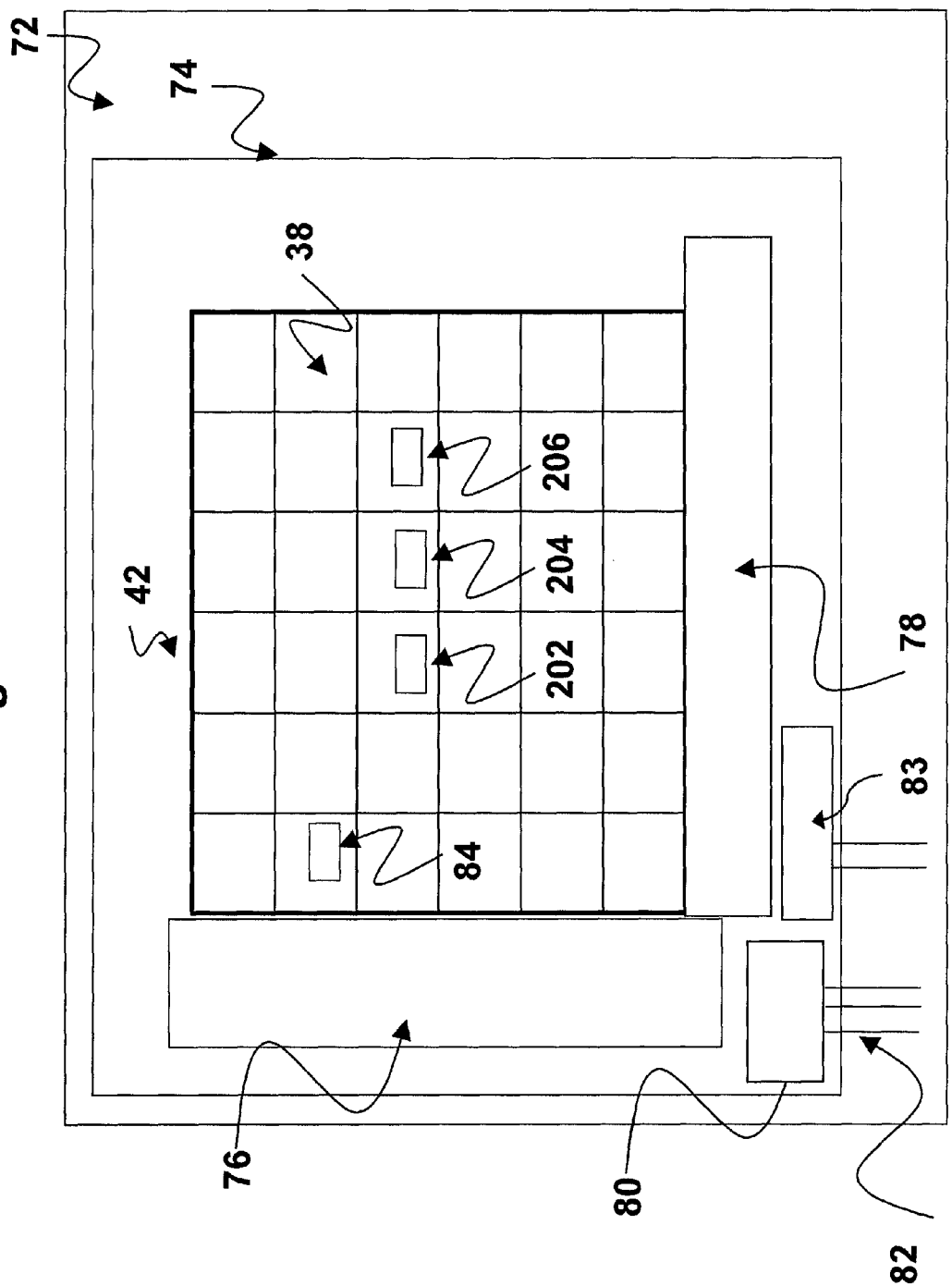
FIG. 3 shows the arrangement of thin film electronics of the device.

The arrangement of thin film electronics 74 upon the substrate 72 is shown in FIG. 3. Each element of the electrode array 42 contains an array element circuit 84 for controlling the electrode potential of a corresponding electrode 38. Integrated row driver 76 and column driver 78 circuits may also be implemented in thin film electronics and may be used to supply control signals to some or all of the array element circuits 84. A serial interface 80 may also be provided to process a serial input data stream and write the required voltages to the electrode array 42. A voltage supply interface 83 provides the corresponding supply voltages, top substrate drive voltages, etc., as described herein. The number of connecting wires 82 between the array substrate 72 and external drive electronics, power supplies etc. can be made relatively few, even for large array sizes.

Figure 4:
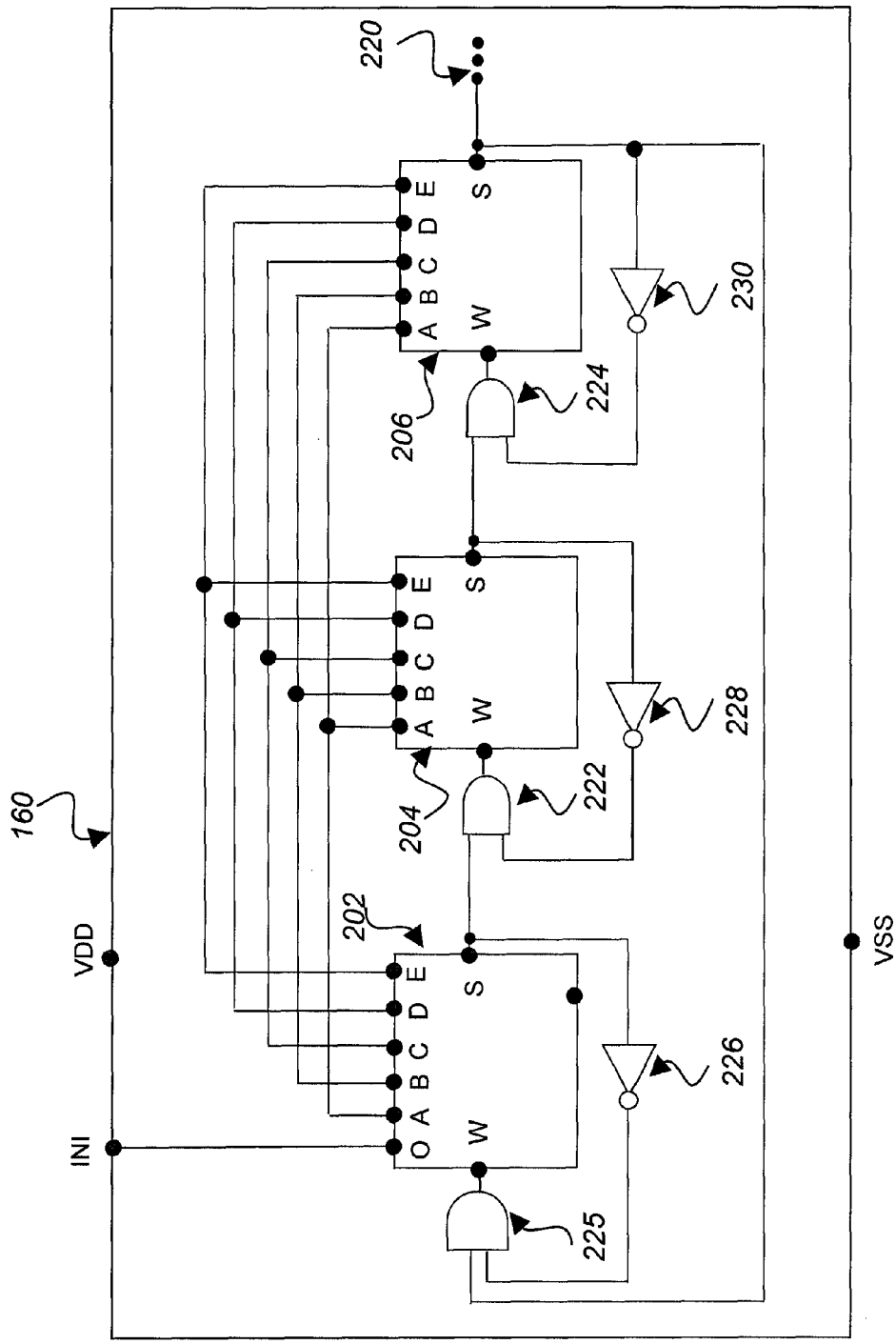
FIG. 4 shows a droplet manipulation circuit; the connectivity of array element circuits within the device according to a first embodiment of the invention.

Auxiliary circuitry may also be implemented in the thin film electronics 74 such that some array elements are directly connected to adjacent array elements in sequence so as to form N array elements connected in sequence. N may any integer greater than or equal to 2. For example, a droplet manipulation circuit 160 in accordance with an embodiment of the invention includes spatially adjacent array elements 202, 204 and 206 as shown in FIG. 4. These array elements are not necessarily connected to the row driver 76 and column driver 78 circuits like other of the array elements. Instead, logic circuitry is provided which "hard-codes" a desired operation among adjacent array elements. The logic circuitry directly connects the sensor output(s) of one or more of the N array elements to the write signal input(s) of other of the N array elements so as not to require external control signals, etc. For example, the connectivity of the three adjacent array element circuits 202, 204 and 206 may be according to the first embodiment as shown in FIG. 4.

The droplet manipulation circuit 160 connecting array elements 202, 204 and 206 includes the following components:

A first array element 202
A second array element 204
A third array element 206
An AND gate 222
An AND gate 224
Logical inverters 226, 228 and 230

The circuitry is connected as follows:

A sensor output S of the first array element 202 is connected to the input of an inverter 226 and the first input of AND gate 222. The output of inverter 226 is connected to a first input of AND gate 225. The output of AND gate 225 is connected to the write input W of the first array element 202. An external input INI is connected to the override input O of the first array element 202. The override input of the second 204 and third 206 array elements are not connected and have been omitted from FIG. 4 for clarity. The output of AND gate 222 is connected to a write input W of the second array element 204. A sensor output S of the second array element 204 is connected to the input of inverter 228 and to the first input of AND gate 224. The output of inverter 228 is connected to the second input of AND gate 222. The output of AND gate 224 is connected to a write input W of the third array element 206. A sensor output S of the third array element 206 is connected to the input of inverter 230, and the output of the inverter 230 is connected to the second input of AND gate 224. The input of inverter 230 is also connected to the second input of AND gate 225. The sensor output S of the third array element 206 may also be connected as an output to other circuitry or to further array elements in the chain, indicated by the three dots 220 in FIG. 4. Additional array elements in the chain (not shown) are arranged so that the sensor output S of the Nth array element feeds back through an inverter and an AND gate to the write input of the Nth array element.

Figure 4A:
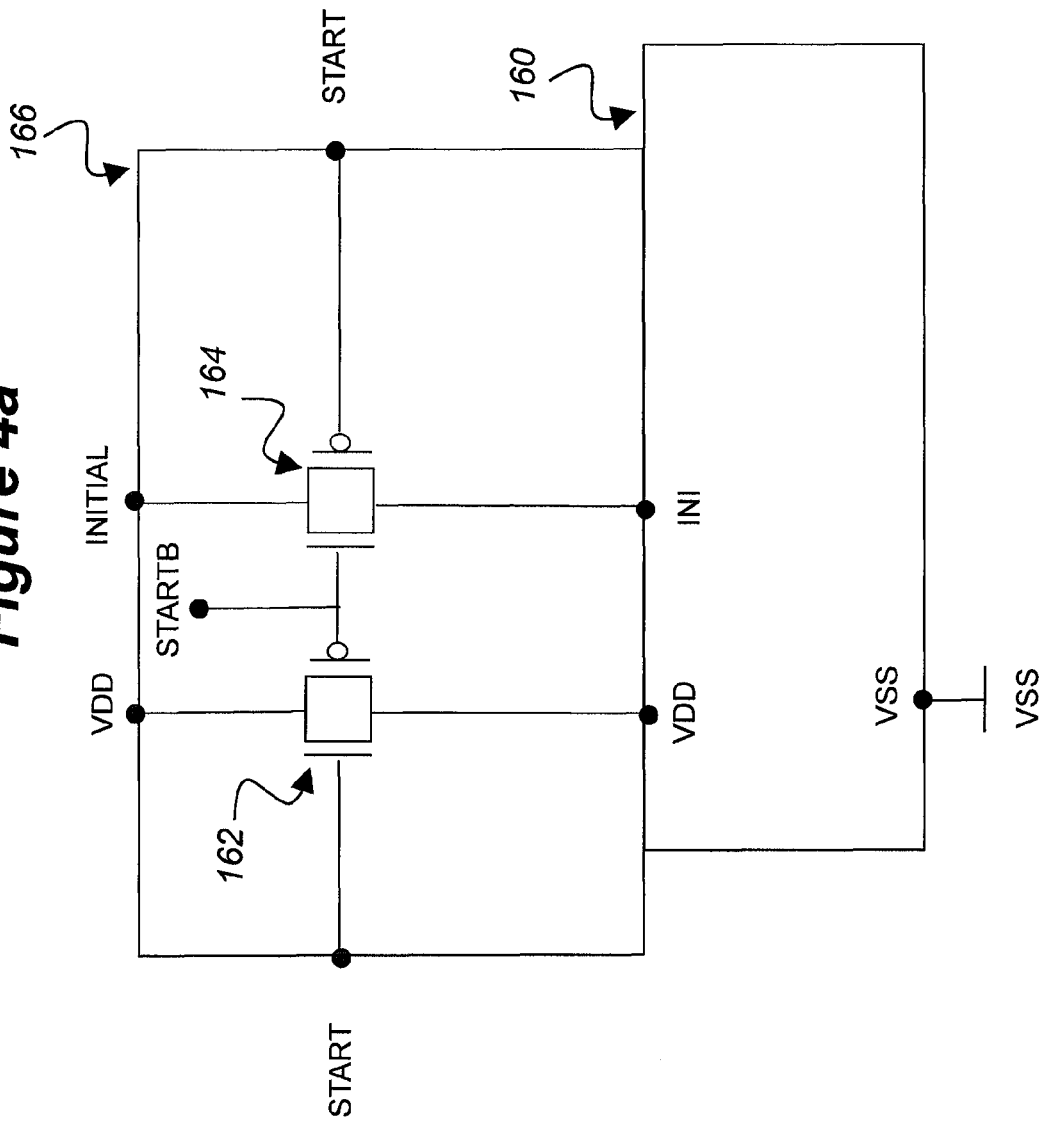
FIG. 4a shows an initialization circuit and droplet manipulation circuit within the device according to the first embodiment of the invention.

The auxiliary circuitry also may include an initialization circuit 166 to initialize the write input of one or more array elements in the chain and thereby control the start-up sequence of the droplet manipulation circuit 160, shown in FIG. 4a.

The initialization circuit 166 is connected as follows.

An analogue switch (ASW) 162 is connected between the VDD power supply of the droplet manipulation circuit 160 and an external VDD supply. A second analogue switch 164 is connected between the INI input of the droplet manipulation circuit 160 and an external supply INITIAL. A control pulse START is connected to the gate of the n-type transistor of analogue switch 164 and the gate of the p-type transistor of the analogue switch 162. A control pulse STARTB is connected to the gate of the n-type transistor of analogue switch 162 and the gate of the p-type transistor of analogue switch 164.

Each of the array elements 202, 204 and 206 include control inputs A through E, and an override input O which is only externally connected in the case of the first array element 202. Where not externally connected, this input is omitted for clarity. The control inputs A of the array elements 202, 204 and 206 are all connected together. The control inputs B of the array elements 202, 204 and 206 are all connected together. The control inputs C of the array elements 202, 204 and 206 are all connected together. The control inputs D of the array elements 202, 204 and 206 are all connected together. The control inputs E of the array elements 202, 204 and 206 are all connected together.

Figure 5:
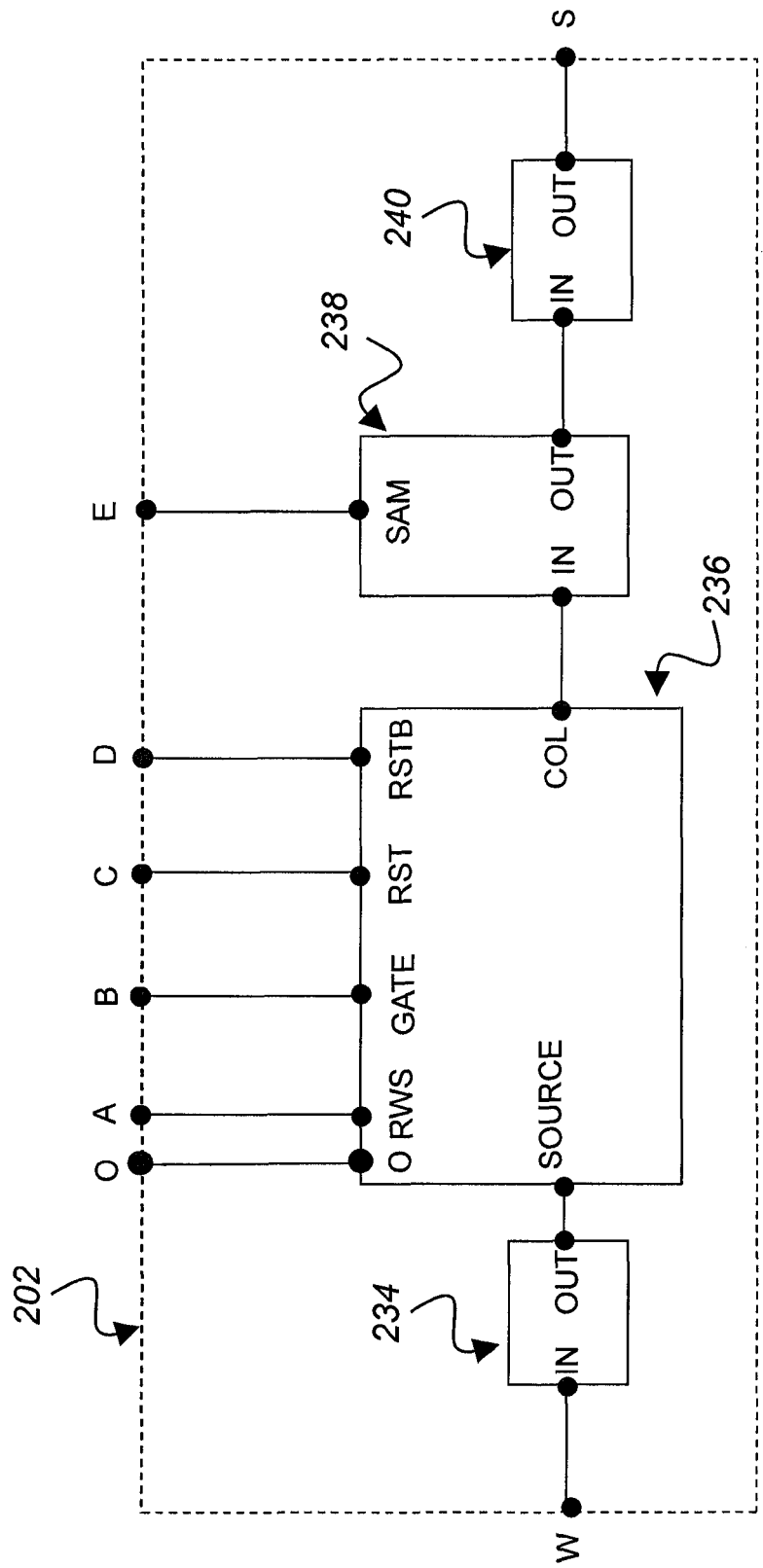
FIG. 5 shows an example implementation of the first array element circuit according to the first embodiment of the invention.

An example design of the first array element 202 is shown in FIG. 5. The second 204 and third 206 array elements may be of identical or similar construction to 202 and may operate in a similar or identical manner.

The first array element 202 includes the aforementioned write input W, sensor output S, control inputs A-E and O and contains the following components:

A level shifter 234, of standard design, with input IN and output OUT
An EW write and sense circuit 236 as described below
A bias and sample circuit 238, of standard construction and as described below
A digitization and latch circuit 240. This circuit may consist, for example, of a D-type flip-flop of standard construction.

Figure 6:
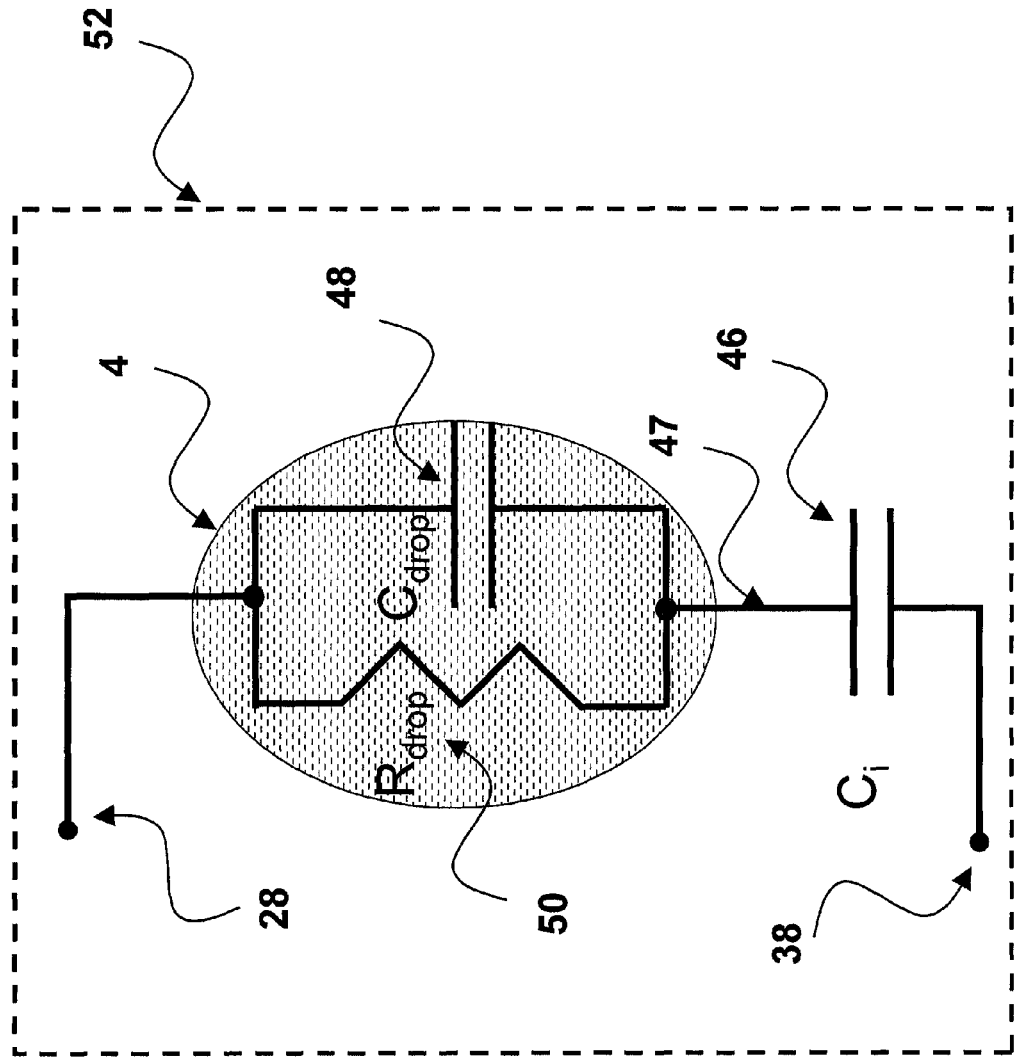
FIG. 6 shows a model for the impedance presented between an EWOD drive electrode and the conductive layer of the top substrate when a droplet is present.
Figure 7:
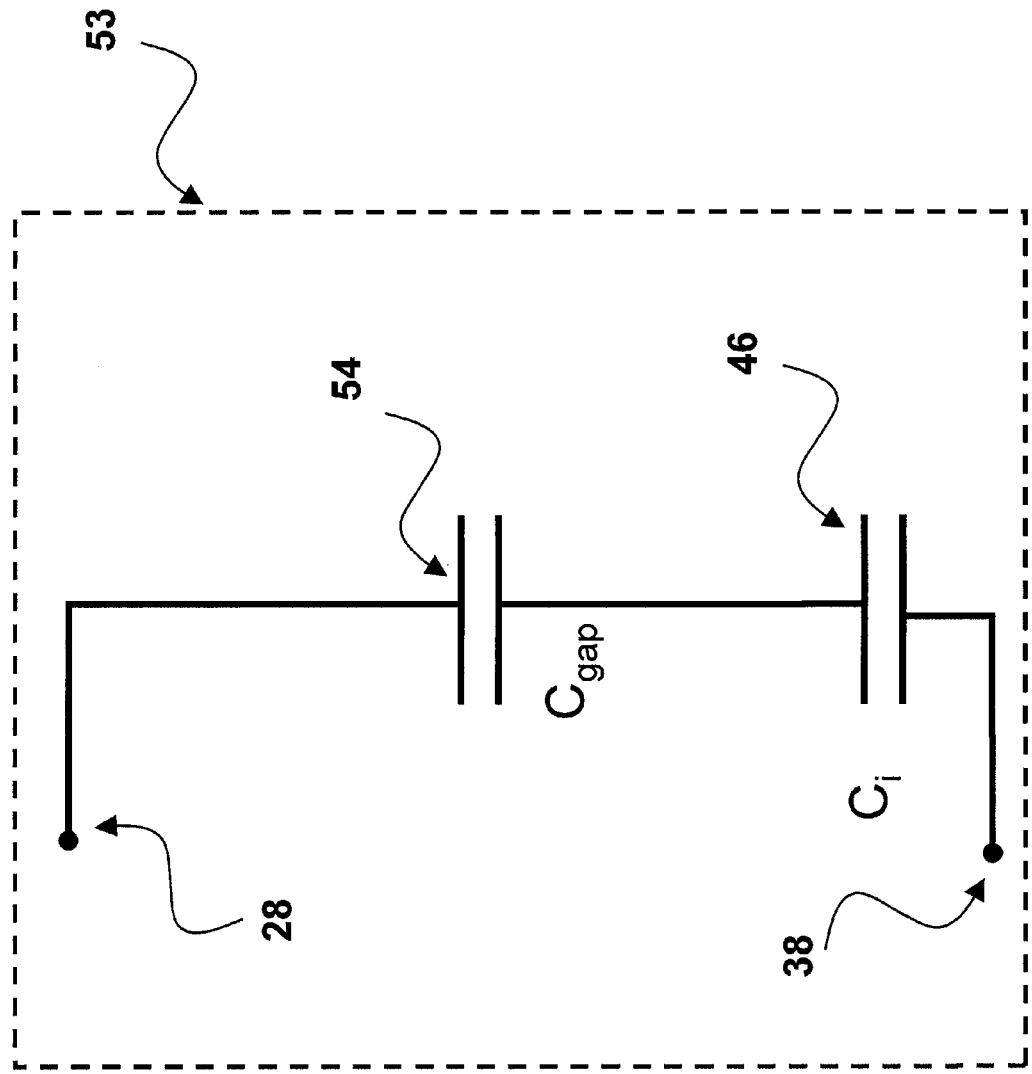
FIG. 7 shows a model for the impedance presented between an EWOD drive electrode and the conductive layer of the top substrate when a droplet is absent.

The sensor function of the first array element 202 for sensing a property (e.g., impedance) of a droplet 4 in relation thereto could rely on any of several known transduction or sense mechanisms and be implemented in any of several ways while remaining within the scope of the invention. One particularly useful method of sensing is measuring the electrical impedance between an electrode 38 (e.g., 38A, 38B, etc.) of the lower (patterned) substrate 72 and the electrode 28 of the top substrate 36. FIG. 6 shows an approximate circuit representation 52 of the impedance in the case where a droplet is present. A capacitor 46 representing the capacitance $C_I$ of the insulator layers (including the hydrophobic layers 16 and 26) is in series with the impedance of the droplet 4 which can be modeled as a resistor 50 having a resistance $R_{drop}$ in parallel with a capacitor 48 having a capacitance $C_{drop}$. FIG. 7 shows the corresponding approximate circuit representation 53 in the case where there is no droplet present. In this instance the impedance is that of the insulator layer capacitor 46 in series with a capacitor 54 representing the capacitance of the cell gap, $C_{gap}$.

For ease of explanation, the above-described electrical impedance between the electrodes 28 and 38 for a given array element can be represented as a load capacitor 154 having a value $C_L$.

Figure 8:
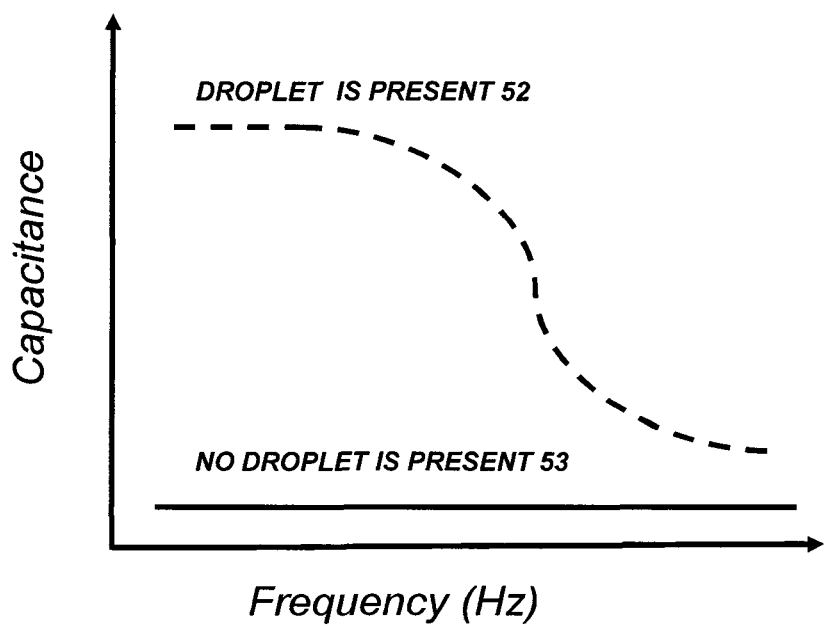
FIG. 8 shows a graph of the imaginary component of the impedance as a function of frequency with a droplet present and with a droplet absent.

FIG. 8 shows schematically the dependence of the value $C_L$ of the load capacitor 154 with respect to frequency in the cases where a droplet 4 is present 52 and where no droplet is present 53. In the case where there is no droplet present, the impedance as noted in FIG. 7 has no real (i.e. resistive) component, and the impedance of the load capacitor 154 will be that of a frequency independent capacitor. In the case where the droplet having a resistive and capacitive element is present as represented in FIG. 6, the value $C_L$ will vary as a function of frequency. It can thus be readily appreciated that by measuring the impedance the present invention is able to determine whether or not a droplet 4 is present at a given write node. Furthermore the value of the parameters $C_{drop}$ and $R_{drop}$ are a function of the size of the droplet and the conductivity of the droplet. It is therefore possible to determine information relating to droplet size and droplet constitution by means of a measurement of impedance.

The EW write and sense circuit 236 and bias and sample circuit 238 of FIG. 5 are described as follows with reference to FIG. 9. This circuit 236 performs the functions of writing a voltage and additionally incorporates a means for sensing the impedance present at the write node.

The EW write and sense circuit 236 includes the following elements:
- A switch transistor 68
- A capacitor $C_S$ 58
- A coupling capacitor $C_C$ 146
- A diode 148
- A diode 147
- A transistor 94

Connections supplied to the array element are as follows:
- A SOURCE connection
- A GATE connection
- A sensor row select line RWS
- A reset line RST
- A second reset line RSTB
- A power supply line VDD which may be common to all elements in the array
- A sensor output line COL
- An external override O The EW write and sense circuit 236 contains an EW drive electrode 38 to which a voltage $V_{WRITE}$ can be programmed. Also shown is the load element 154 represented by capacitor $C_L$. The load capacitor 154 specifically represents the impedance between the EW drive electrode 38 and the electrode 28 of the top substrate 36 as described above, and thus represents the impedance presented by the hydrophobic cell included in the array element. The value $C_L$ of the load capacitor 154 is dependent on the presence of, size of and constitution of any liquid droplet 4 located at the hydrophobic cell within that particular array element within the array.

The EW write and sense circuit 236 is connected as follows:

The source addressing line SOURCE is connected to the drain of transistor 68. The gate addressing line GATE is connected to the gate of transistor 68. The source of transistor 68 is connected to the EW drive electrode 38 and storage capacitor 58 having a capacitance $C_S$. The source addressing line SOURCE, transistor 68, gate addressing line GATE and storage capacitor 58 make up writing circuitry for writing a drive voltage to the EW drive electrode 38 as will be further described herein. Storage capacitor 58 is connected between the EW drive electrode 38 and the sensor row select line RWS. Coupling capacitor 146 having a capacitance $C_C$ is connected between the EW drive electrode 38 and the gate of transistor 94. The anode of the diode 148 is connected to the reset line RST. The cathode of the diode 148 is connected to the gate of transistor 94 and to the anode of diode 147. The cathode of diode 147 is connected to the reset line RSTB. The drain of transistor 94 is connected to the VDD power supply line. The source of transistor 94 is connected to the sensor output line COL shared between the array elements of the same column. The external override O is connected to the EW drive electrode 38.

The operation of the EW write and sense circuit 236 is as follows:

In operation the EW write and sense circuit 236 performs two basic functions, namely (i) writing a voltage to the drive element comprising the EW drive electrode 38 so as to control the hydrophobicity of the hydrophobic cell within the array element; and (ii) sensing the impedance presented by the hydrophobic cell at the drive element including the EW drive electrode 38.

In order to write a voltage, the required write voltage $V_{WRITE}$ is programmed onto the source addressing line SOURCE. The write voltage $V_{WRITE}$ may be determined by the output of the level shifter circuit 234 of the array element circuit as shown in FIG. 5.

The gate addressing line GATE is then taken to a high voltage (via the control input B of the array element circuit as shown in FIG. 5) such that transistor 68 is switched on. The voltage $V_{WRITE}$ is then written to the EW drive electrode 38 and stored on the capacitance present at this write node, and in particular on capacitor 58 (which in general is substantially larger in capacitance value than coupling capacitor 146). The gate addressing line GATE is then taken to a low level via the control input B to turn off transistor 68 and complete the write operation.

In order to sense the impedance presented at the EW drive electrode 38 following the writing of the voltage $V_{WRITE}$, a sense node 102 within the EW write and sense circuit 236 is first reset.

Specifically, sense circuitry included within the circuit 236 includes reset circuitry which performs the reset operation. The reset circuitry includes, for example, the diodes 148 and 147 connected in series with sense node 102 therebetween. As noted above, the opposite ends of the diodes 148 and 147 are connected to the reset lines RST and RSTB, respectively, which in turn are connected to control inputs C and D, respectively, as shown in FIG. 5. The reset operation, if performed, occurs by taking the reset line RST to its logic high level, and the reset line RSTB to its logic low level. The voltage levels of the reset lines RST and RSTB are arranged so that the logic low level of reset line RSTB and the logic high level of the reset line RST are identical, a value VRST. The value VRST is chosen so as to be sufficient to ensure that transistor 94 is turned off at this voltage. When the reset operation is effected, one of diodes 148 or 147 is forward biased, and so the sense node 102 is charged/discharged to the voltage level VRST. Following the completion of the reset operation, the reset line RST is taken to its logic low level and the reset line RSTB to its logic high level. The voltage levels of the reset line RST low logic level and reset line RSTB high logic level are each arranged so as to be sufficient to keep both diodes 148 and 147 reversed biased for the remainder of the sense operation.

Figure 9:
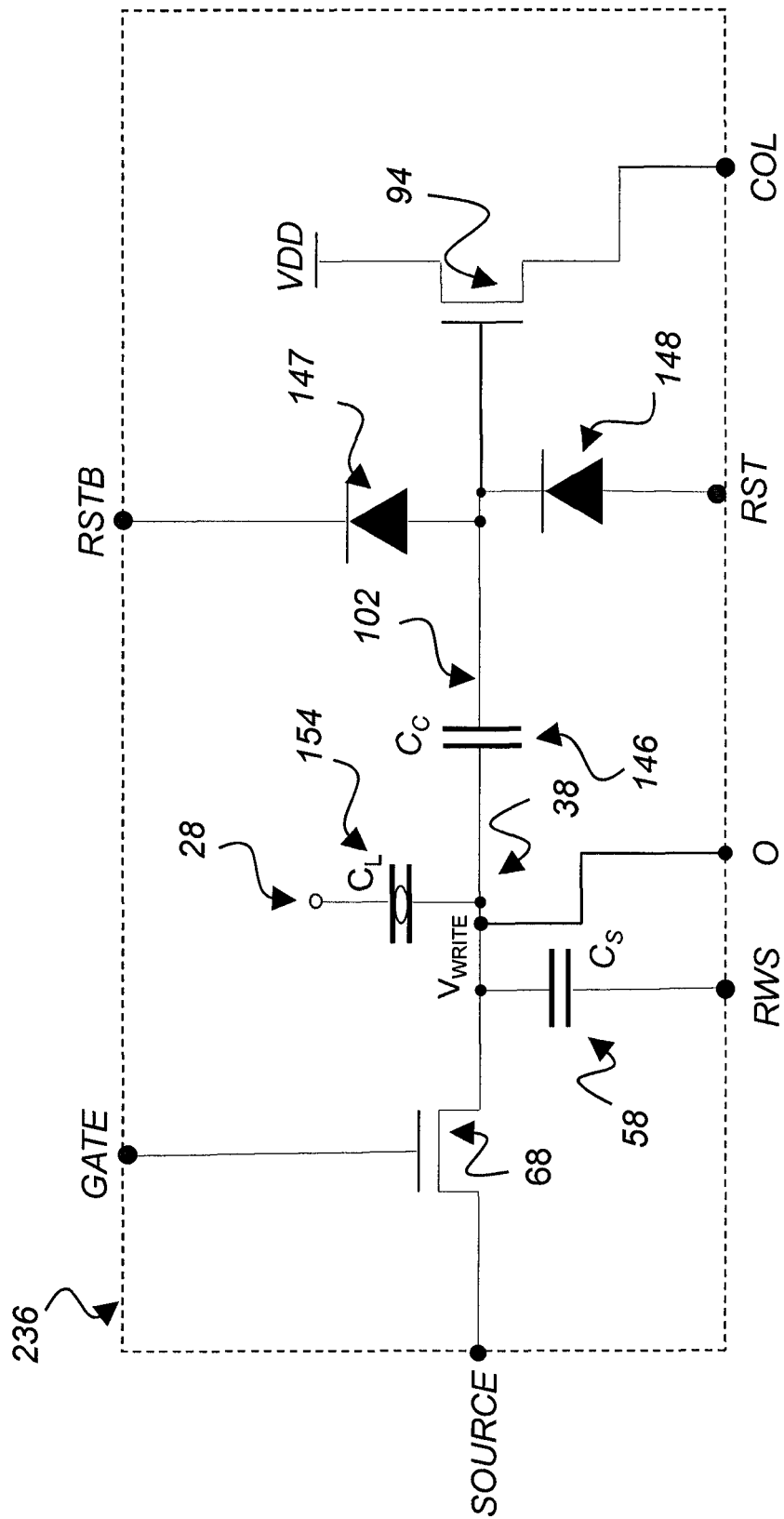
FIG. 9 shows the EW write and sense circuit of the first array element circuit according to the first embodiment of the invention.

The sense circuitry of this the embodiment of FIG. 9 includes the sensor row select line RWS, coupling capacitor 146, transistor 94 and sensor output line COL. In order to sense the impedance presented at the drive element by the hydrophobic cell in the array element, a voltage pulse of amplitude $\Delta VRWS$ is then applied to the sensor row select line RWS via control input A (FIG. 5). The pulse is coupled to the EW drive electrode 38 via the storage capacitor 58. Since transistor 68 is turned off the voltage $V_{WRITE}$ at the EW drive electrode 38 is then perturbed by an amount ($\Delta V_{WRITE}$) that is proportional to $\Delta VRWS$ and also depends on the magnitude of the voltage pulse on sensor row select line RWS and the relative values $C_C$, $C_S$ and $C_L$ of the coupling capacitor 146, storage capacitor 58 and load capacitor 154, respectively (and also parasitic capacitances of transistors 94 and 68 and diodes 148 and 147). In the assumption that the parasitic components are small the perturbation is given by:

$$\Delta V_{WRITE} = \Delta VRWS \times \frac{C_S}{C_{TOTAL}} \quad \text{(equation 2)}$$

where $$C_{TOTAL} = C_S + C_C + C_L \quad \text{(equation 3)}$$

In general the capacitive components are sized such that storage capacitor 58 is of similar order in value to the load impedance as represented by the load capacitor 154 in the case when a droplet 4 is present, and such that the storage capacitor 58 is 1-2 orders of magnitude larger in value than the coupling capacitor 146. The perturbation $\Delta V_{WRITE}$ in the voltage of the EW drive electrode 38 due to the pulse $\Delta VRWS$ on the sensor row select line RWS 104 then also results in a perturbation $\Delta V_{SENSE}$ of the potential at the sense node 102 due to the effects of the coupling capacitor 146. The perturbation $\Delta V_{SENSE}$ in potential at the sense node 102 is given approximately by $$\Delta V_{SENSE} = \Delta V_{WRITE} \times \frac{C_C}{C_C + C_{DIODE} + C_T}$$

where $C_{DIODE}$ represents the capacitance presented by diode 148 and $C_T$ represents the parasitic capacitance of transistor 94. In general the circuit is designed so that the coupling capacitor 146 is larger than the parasitic capacitances $C_{DIODE}$ and $C_T$. As a result the perturbation $\Delta V_{SENSE}$ of the voltage at the sense node 102 is in general similar to the perturbation $\Delta V_{WRITE}$ of the write node voltage at the EW drive electrode 38 (though this is not necessarily required to be the case). The storage capacitor 58 has a dual function; it functions as a storage capacitor, storing an electrowetting voltage which is written to the array element. It also functions as a reference capacitor when sensing impedance; the impedance is measured essentially by comparing the value $C_S$ to the droplet capacitance $C_{drop}$.

The overall result of pulsing the sensor row select line RWS is that the voltage potential at the sense node 102 is perturbed by an amount $\Delta V_{SENSE}$ that depends on the impedance $C_L$ represented by the load capacitor 154 (which again is dependent on the presence of, size of and constitution of any droplet 4 located at the particular array element) for the duration of the RWS pulse. As a result the transistor 94 may be switched on to some extent during the RWS operation in which the RWS pulse is applied to the sensor row select line RWS. The sensor output line COL is loaded by a suitable bias and sample circuit 238 (FIG. 5) as will shortly be described. Transistor 94 thus operates as a source follower and the output voltage appearing at the sensor output line COL during the row select operation is a function of the impedance $C_L$ represented by the load capacitor 154. The EW write and sense circuit 236 of FIG. 9 thus acts to sense and measure the value of $C_L$.

The external override input O may be used to supply an externally connected signal directly to the EW drive electrode 38. This may be used to supply an initial condition prior to operation of the circuit, for example when the rest of the circuitry is powered down.

According to the arrangement of the EW write and sense circuit 236 of FIG. 9, the EW write function is implemented in effect as a dynamic random access memory (DRAM) cell (comprising switch transistor 68 and capacitor $C_S$ 58). An alternative arrangement could instead utilize a static random access memory (SRAM) cell for implementing the EW write function.

Figure 9A:
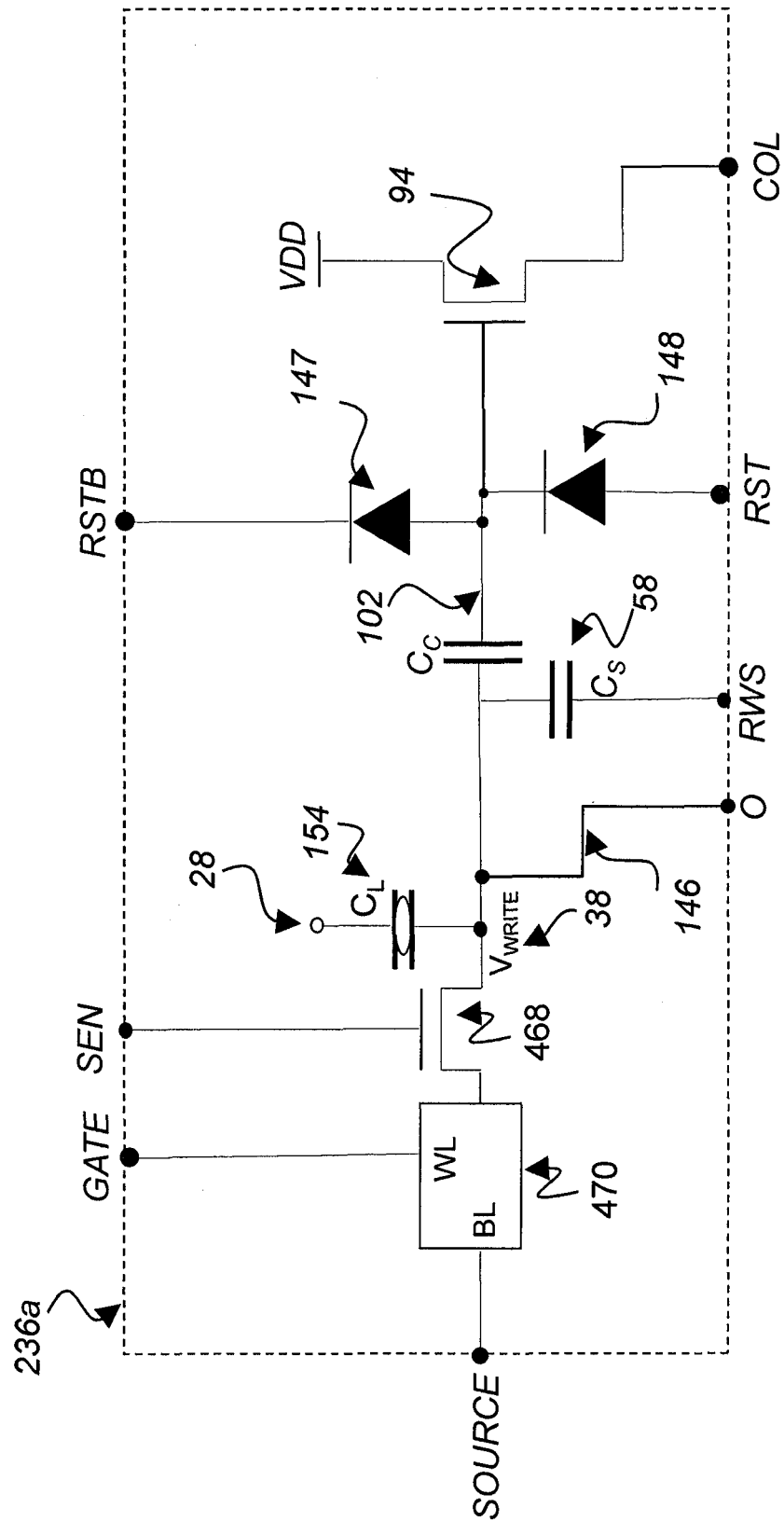
FIG. 9a shows an alternative design of the EW write and sense circuit of the first array element circuit according to the first embodiment of the invention.

FIG. 9a shows an example alternative EW write and sense circuit 236a, which could be used instead of the EW write and sense circuit 236 of FIG. 9.

In the alternative EW write and sense circuit 236a, the switch transistor 68 is replaced by an SRAM cell 470 which may be of standard construction. The bit line (BL) of the SRAM cell 470 is connected to the input SOURCE. The word line (WL) of the SRAM cell 470 is connected to the input GATE. The output of the SRAM 470 OUT is connected to the drain of an additional component, the sensor enable switch transistor 468. The source of the sensor enable switch transistor 468 is connected to the EW drive electrode 38. The gate of the sensor enable switch transistor 468 is connected to an additional input SEN. The input SEN is normally maintained at a high level such that the sensor enable switch transistor 468 is turned on. The output of the SRAM is thus connected to the EW drive electrode 38 thus controlling the potential of this node. The potential of the EW drive electrode 38 may be re-written by applying a high voltage to the input GATE. When this occurs, the output of the SRAM cell 470 will assume the logic state of the bit line (BL) input of the SRAM cell 470 in accordance with standard SRAM operation as is well known.

In all the description that follows it is assumed that the EW write and sense circuit 236 of FIG. 9 has been employed to realize the embodiment. It will however be appreciated by one skilled in the art that alternative circuit arrangements such as 236a could instead be used, and the particular implementation of 236 is not intended to limit the spirit or scope of the invention.

Figure 10:
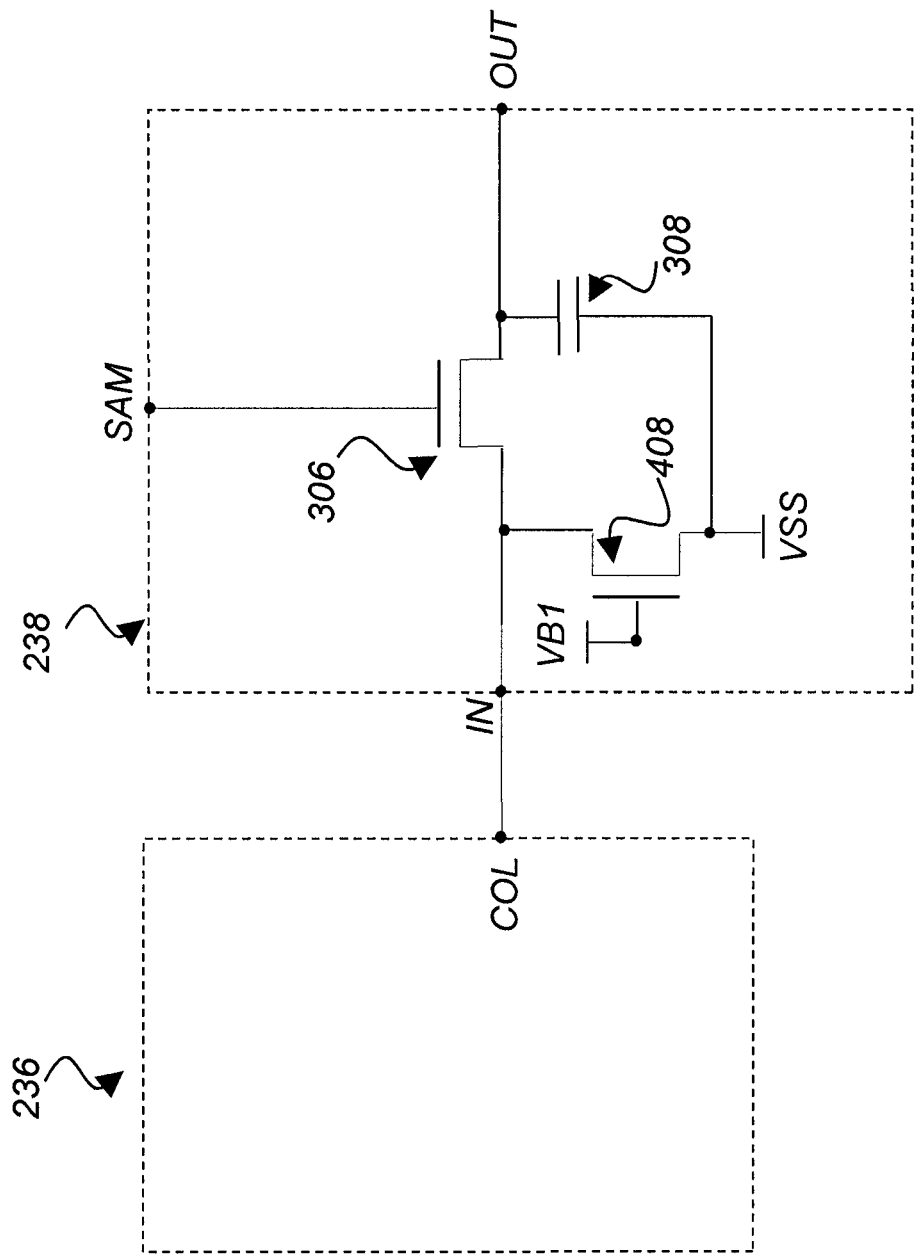
FIG. 10 shows a bias and sample circuit of the first array element circuit according to the first embodiment.

A possible configuration of the bias and sample circuit 238 is shown in FIG. 10. The output COL of the EW write and sense circuit 236 (shown in phantom) is connected to the input IN of the bias and sample circuit 238. The input IN of the bias and sample circuit 238 is connected to the drain of a transistor 408 and the drain of transistor 306. The source of transistor 306 is connected to the output OUT. A capacitor 308 is connected between the output OUT and a ground supply VSS. A sample input signal SAM is connected to the gate of transistor 306 via control input E (FIG. 5). The source of transistor 408 is connected to VSS. The gate of transistor 408 is connected to a bias supply VB1. Transistor 408 acts as the bias device in the source follower arrangement of the sensor, in conjunction with transistor 94 of the array element circuit. Transistor 306 acts as a switch to provide a means for sampling the sensor output voltage appearing at COL onto the capacitor 308, and thereby to the output OUT.

Again with reference to FIG. 5, the first array element 202 is connected as follows:

The write input W of the first array element 202 is connected to the input of level shifter 234. The output OUT of level shifter 234 is connected to the input line SOURCE of the EW write and sense circuit 236. The output COL of circuit 236 is connected to the input IN of the bias and sample circuit 238. The input RWS is connected to control signal A. The input GATE is connected to control signal B. The input RST is connected to control signal C. The input RSTB is connected to control signal D.

The output OUT of the bias and sample circuit 238 is connected to the input IN of the digitization and latch circuit 240. The control signal SAM is connected to input signal E.

The output OUT of the digitization and latch circuit 240 is connected to the sensor output S of the first array element 202.

The purpose of the level shifter 234 is to shift the write voltage level such that the voltage output level is the electrowetting drive voltage. The EW write and sense circuit 236 writes an electrowetting voltage to an array element write node, and senses the impedance at that node, as already described.

The bias and sample circuit 238 biases the sensor output of the EW write and sense and circuit 236, and samples the sensor output S at the times when it is valid. The digitization and latch circuit 240 digitizes the voltage at its input to the appropriate logic level and latches its output at this level.

It will be apparent to one skilled in the art that this circuit arrangement is one example of many possible circuits for realising the desired array element functionality of writing an AM-EWOD write voltage to the drive element and sensing a property (e.g., impedance) of a droplet 4 present thereat.

The array elements 202, 204 and 206 are arranged such that the EW drive electrodes 38 of array elements that are adjacent according to their electrical connectivity are also spatially adjacent. Thus in a situation whereby the write input signals applied to the write inputs W of adjacent array elements are "1" and "0" respectively, the EW drive electrodes 38 are written to high and low voltages respectively, and in the event of a droplet being located at the electrode 38 written to a low voltage, it will move to the adjacent electrode 38 written to a high voltage under the action of the electrowetting force as described in prior art.

The basic operation of the first embodiment is described as follows.

We may consider a situation where a droplet 4 of fluid is initially present at the EW drive electrode 38 of the first array element 202.

Prior to the start of operation the droplet manipulation circuit 160 is in a powered-down state. This can be accomplished by means of the initialization circuit 166 of FIG. 4a. The input signal START is at logic low level and input signal STARTB is at logic high level. As a result, analogue switch 162 is turned off, thus disconnecting the power supply input VDD of the droplet manipulation circuit 160 from the external VDD power supply. Analogue switch 164 is turned on and the input INI of the droplet manipulation circuit 160 is thus connected to the external input INITIAL. By setting INITIAL to logic high level, a high voltage level is supplied to the external override input O of the first array element 202. This in turn sets the EW drive electrode 38 of the first array element 202 at high voltage thus maintaining the droplet of fluid 4 in its initial position.

To begin operation, the input signal START is taken high, and input signal STARTB taken low. This disconnects the input INITIAL from the override input O of the first array element 202. This also connected the external power supply VDD to the droplet manipulation circuit 160. The droplet manipulation circuit 160 is thus powered up and operation can now begin.

Referring back to FIG. 4, each array element is now configured such that when a write input signal representing a logic high level is applied to its write input W, a high voltage level is written to the EW drive electrode 38. The operation of the circuits of array elements 202, 204 and 206 will result in the droplet position being sensed and a logic level "1" appearing at the sensor output S of the first array element 202, and logic "0" levels appearing at the outputs S of the second array element 204 and third array element 206 respectively. As a result of the "1" at the output S of the first array element 202, the output of inverter 226 will then become "0" and thus a logic signal "0" will be applied to the write input W of the first array element 202 to return the first array element 202 to its previous status. At the same time, the "1" at the output S of the first array element 202 will result in the output of AND gate 222 becoming high so that a logic "1" is applied to the write input W of the second array element 204. As a result of the input W of the second array element 204 being high and the input W of the first array element 202 being low, the corresponding voltages written to the EW drive electrodes 38 will cause the droplet 4 to move from the first array element 202 to the second array element 204. Following the completion of the droplet 4 move operation, the sensor of the second array element 204 will sense the new position of the droplet 4. By an analogous line of reasoning to above, when output S of the second array element 204 goes to "1", the write input W of the third array element 206 will go to "1" and the write input W of the second array element 204 will return to "0". The droplet 4 will then move from the second array element 204 to the third array element 206.

Figure 11:
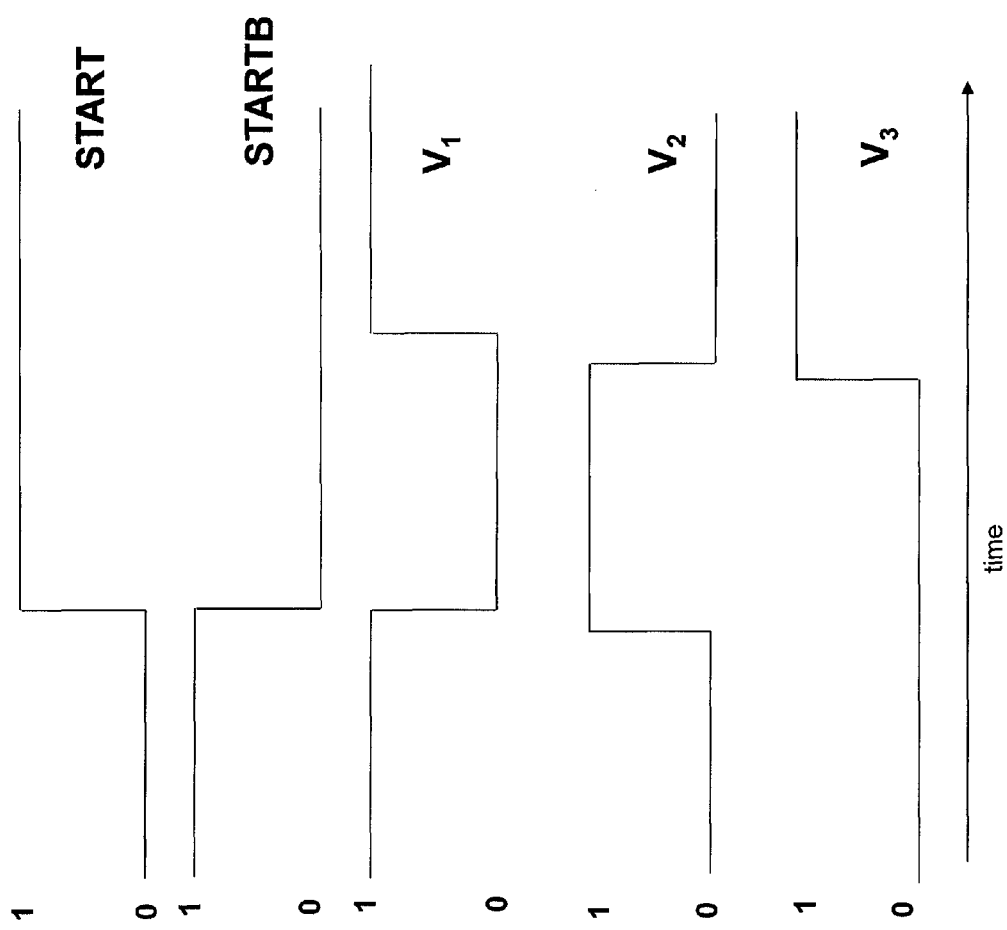
FIG. 11 shows the timing sequence of voltages generated at the write inputs of the array element circuits according to the first embodiment of the invention.

FIG. 11 shows the typical sequence of voltage levels occurring at the write input W of each of the first, second and third array elements, designated $V_1$, $V_2$ and $V_3$, respectively, according to operation as described above. Also shown are the applied signals START and STARTB used to initialize the operation of the droplet manipulation circuit 160.

Figure 12:
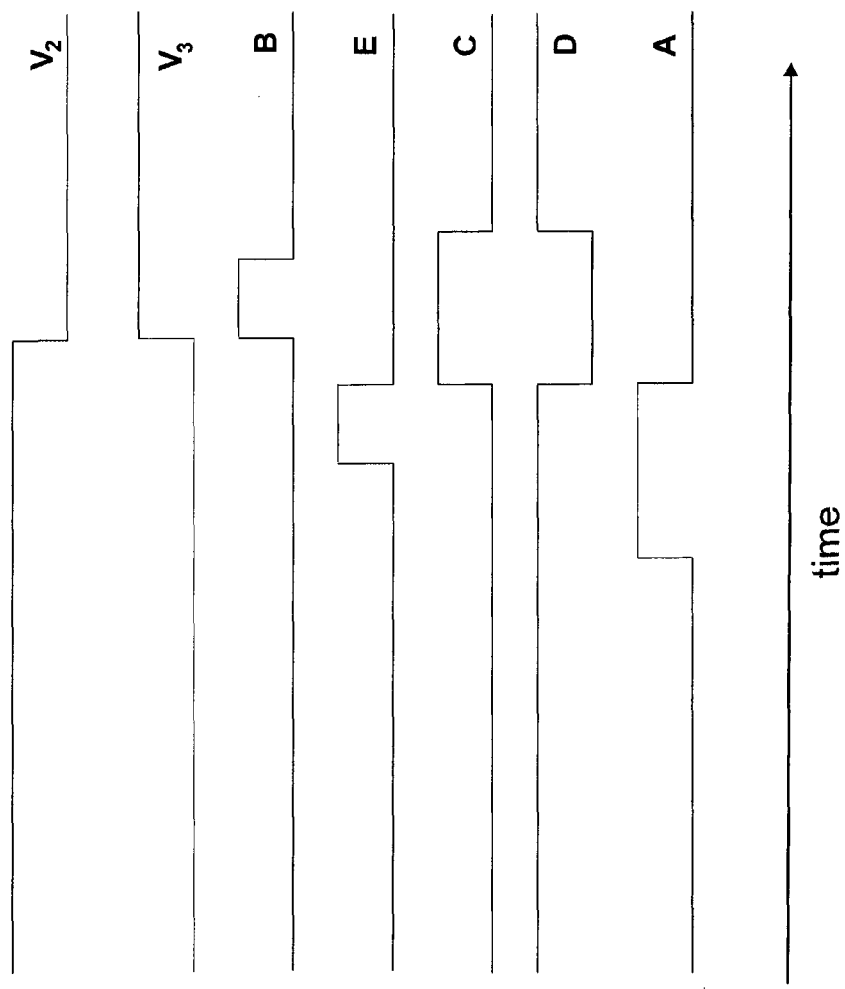
FIG. 12 shows further the timing sequences of applied voltages and voltages generated around the point of a droplet transition according to the first embodiment of the invention.

FIG. 12 shows in more detail the timings around the transition whereby $V_2$ goes low and $V_3$ goes high. The pulse applied to B has the effect of transferring the voltage at the write input to the AM-EWOD drive electrode 38 as for the circuit shown in FIG. 9. The transition whereby $V_1$ goes low and $V_2$ goes high thus happens when B goes high. Signals A, C, D control the operation of the sensor capability of the AM-EWOD array element as previously described. The application of the pulse on E samples the sensor output.

It may be noted that upon the droplet 4 reaching the EW drive electrode 38 of the third array element 206, the sensor output from the third array element will go to logic high. This will in turn result in the logic output of AND gate 225 going to logic high and the write input to the first array element 202 becoming high. This has the effect of restoring the write status of the first element to its initial condition (prior to the transition in START). It will, however, have no influence on the motion of the droplet, which is now at the position of the third array element 206 and will be unable to return to the position of the first array element 202 since it is not spatially adjacent to it.

Typically, but not necessarily, the time delays associated with the operation of the electronic logic stages will be much less than the time required for droplet movement. Also typically, but not necessarily, the timing of the control and sample pulses A, B, C, D and E will be arranged such that the sensor output is measured and sampled at a frequency well in excess of the frequency associated with droplet transfers between array elements. The row driver circuit 76 and the column driver circuit 78 are configured to provide the control and sample pulses A, B, C, D and E to the array elements in accordance with the description herein.

This embodiment has described an array consisting of three array elements and associated logic circuitry. It will be apparent to one skilled in the art that additional elements and logic components may be added to the sequence such that the total number of array elements may be any number.

In essence, the embodiment provides a means for localised feedback "in situ", whereby the sensor output of an array element is used to control the write input of an adjacent element.

The advantages of this mode of operation include:
Feedback can be performed very rapidly. Using the sensor function to trigger the write function of neighboring array elements can thus maximize the speed of transfer of a droplet through an array
Feedback can be performed very efficiently. By implementing the means of feedback locally, the requirements for off-chip processing of sensor data are eliminated It will be apparent to one skilled in the art how this embodiment may be expanded to include an arbitrary number of array elements through which the droplet may be moved and sensed. Moreover, although the neighboring array elements have been described herein as being linearly adjacent, it will be appreciated that they instead may be adjacent along a non-linear path without departing from the scope of the invention.

A complete LoaC system could be formed, for example, by incorporating the described device within a complete system, for example as is described in described in "Digital microfluidics: is a true lab-on-a-chip possible?, R. B. Fair, Micofluid Nanofluid (2007) 3:245-281. Such a system could, for example, contain the following elements:

One or more AM-EWOD arrays as described
A channel microfluidics capability for supplying fluid samples and reagents in an AM-EWOD array and for performing pre-processing steps
Means for inputting fluid samples and reagents
Means for performing a chemical or biochemical test or a chemical or biochemical assay
Control electronics, for example a chip reader or a PC.

Figure 13:
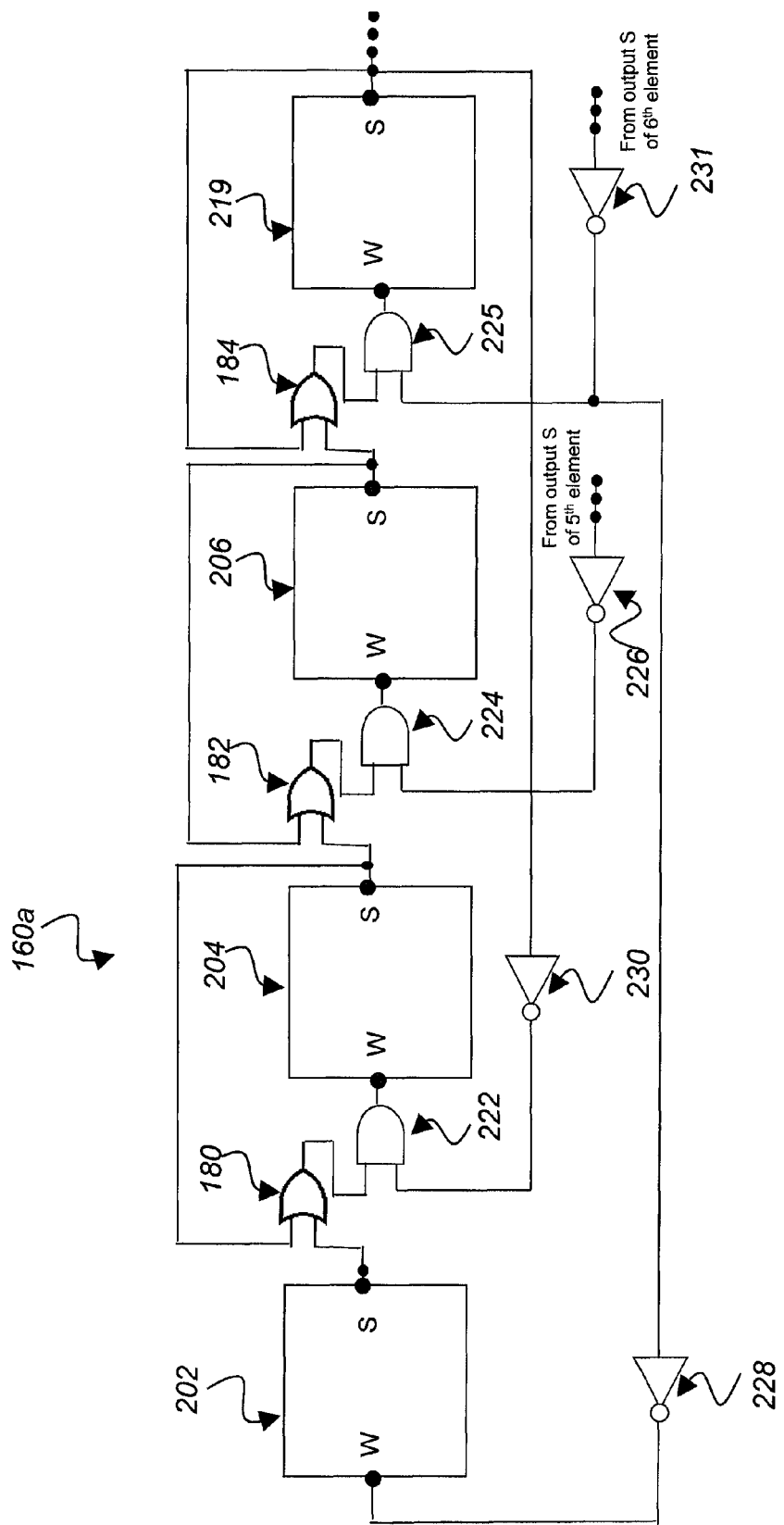
FIG. 13 shows the connectivity of array element circuits within the device according to a second embodiment of the invention

A second embodiment of the present invention includes an AM-EWOD as described for the first embodiment, with the difference that an alternative droplet manipulation circuit 160a to connect array elements is used. More specifically the connectivity between the array elements and logic elements (inverters, AND gates and OR gates) is arranged differently. The droplet manipulation circuit of this embodiment is as shown in FIG. 13, showing four array elements. For sake of brevity, only the relevant differences between the droplet manipulation circuit of the alternative embodiments and that of the first embodiment are described.

The sensor output S of the first array element 202 is connected to the second input of OR gate 180. The output of OR gate 180 is connected to the first input of AND gate 222. The output of AND gate 222 is connected to the write input W of the second array element 204. The sensor output S of the second array element 204 is connected to the first input of OR gate 180 and to the second input of OR gate 182. The output of OR gate 182 is connected to the first input of AND gate 224. The output of AND gate 224 is connected to the write input W of the third array element 206. The sensor output S of the third array element 206 is connected to the second input of OR gate 184 and to the first input of OR gate 182. The output of OR gate 184 is connected to the first input of AND gate 225. The output of AND gate 225 is connected to the write input W of the fourth array element 219. The sensor output S of the fourth array element 219 is connected to the first input of OR gate 184 and to the input of inverter 230. The output of inverter 230 is connected to the second input of AND gate 222. Multiple additional array elements and logic components are present (not shown in FIG. 13) replicating the connectivity arrangements of the second to fourth array elements. The sensor output S of a fifth array element connects to the input of inverter 226. The output of inverter 226 connects to the second input of AND gate 224. The sensor output S of a sixth array element connects to the input of inverter 231. The output of inverter 231 connects to the second input of AND gate 225 and also to the input of inverter 228. The output of inverter 228 connects to the write element W of the first array element 202.

In general, for the nth element present in the chain of N elements, the nth element has an associated OR gate, whose output is connected to the first input of an associated AND gate, whose output in turn is connected to the write input of the nth element. The sensor output S of the nth element feeds back to the first input of the associated OR gate. The sensor output of the (n−1)th element is connected to the second input of the OR gate associated with the Nth element. The sensor output of the (n+2)th element feeds back via an inverter to the second input of the AND gate associated with the nth element.

In the diagram of FIG. 13 of this embodiment and other subsequent embodiments, the input control signals to the array elements, A, B, C, D, E and O, have been omitted for clarity but may be arranged as was the case for the first embodiment.

Figure 14:
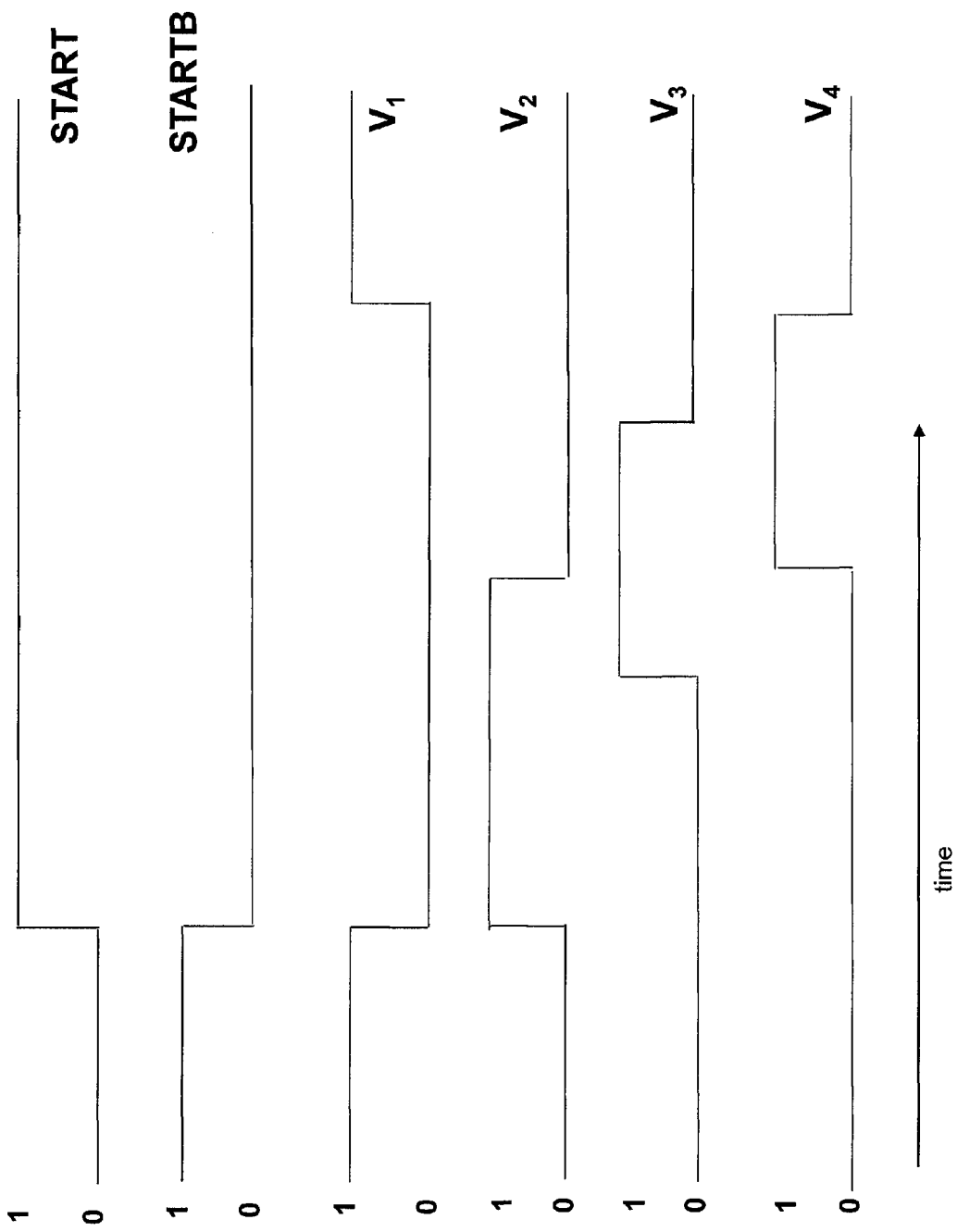
FIG. 14 shows the timing sequence of voltages generated at the write inputs of the array element circuits according to the second embodiment of the invention.

The operation of the second embodiment is similar to the first embodiment, with the exception that the write voltages $V_1$, $V_2$, $V_3$ and $V_4$ occurring at the respective array element write inputs W follow the timing schematic shown in FIG. 14. According to this arrangement of the control logic, the potentials applied to the EW drive electrodes are configured such that at any moment in time two adjacent EW drive electrodes 38 are held at the high potential so as to be able to receive and/or retain the droplet.

An advantage of this embodiment is that the timing scheme generated (shown FIG. 14) may afford superior droplet dynamics and speeds of transfer, in comparison to the arrangement of the first embodiment. A further advantage is that this arrangement may facilitate more reliable droplet transfer.

A further advantage of this embodiment is that the arrangement can be used to transfer larger droplets of fluid, whose spatial extent occupies two array elements of the array.

It will be apparent to one skilled in the art that variants of the first and second embodiments can be realised such that different numbers of adjacent array elements are arranged to be at high level at any moment in time. This can be implemented by changing the connectivity of the logic components of the circuit, as will be obvious to one skilled in the art.

Figure 15:
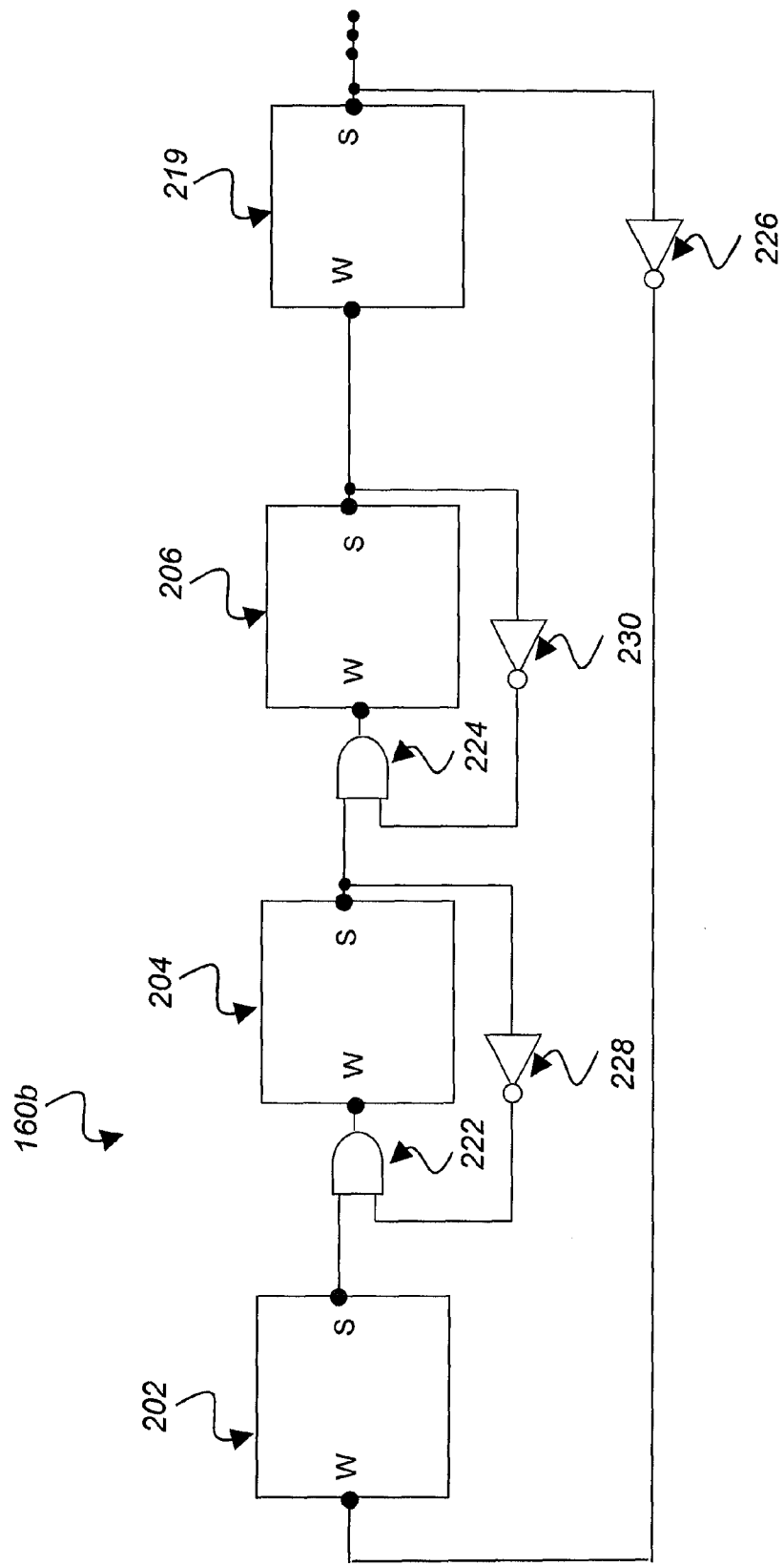
FIG. 15 shows the connectivity of array element circuits within the device according to a third embodiment of the invention.

The third embodiment of the invention is shown in FIG. 15. This embodiment is similar to the first embodiment except that a different droplet manipulation circuit 160b is employed.

The droplet manipulation circuit 160b of this embodiment is connected as follows:

The output of inverter 226 is connected to the write input W of the first array element 202. The sensor output S of the first array element 202 is connected to the first input of AND gate 222. The output of AND gate 222 is connected to the write input W of the second array element 204. The sensor output S of the second array element 204 is connected to the first input of AND gate 224 and also to the input of inverter 228. The output of inverter 228 is connected to the second input of AND gate 222. The output of AND gate 224 is connected to the write input W of the third array element 206. The sensor output S of the third array element 206 is connected to the write input W of the fourth array element 219 and also to the input of inverter 230. The output of inverter 230 is connected to the second input of AND gate 224. The sensor output S of the fourth array element 219 is connected to the input of inverter 226. As before the control signals A, B, C, D, E and O to each array element may be connected as the first embodiment and have been omitted on the figure for the sake of clarity.

Figure 16:
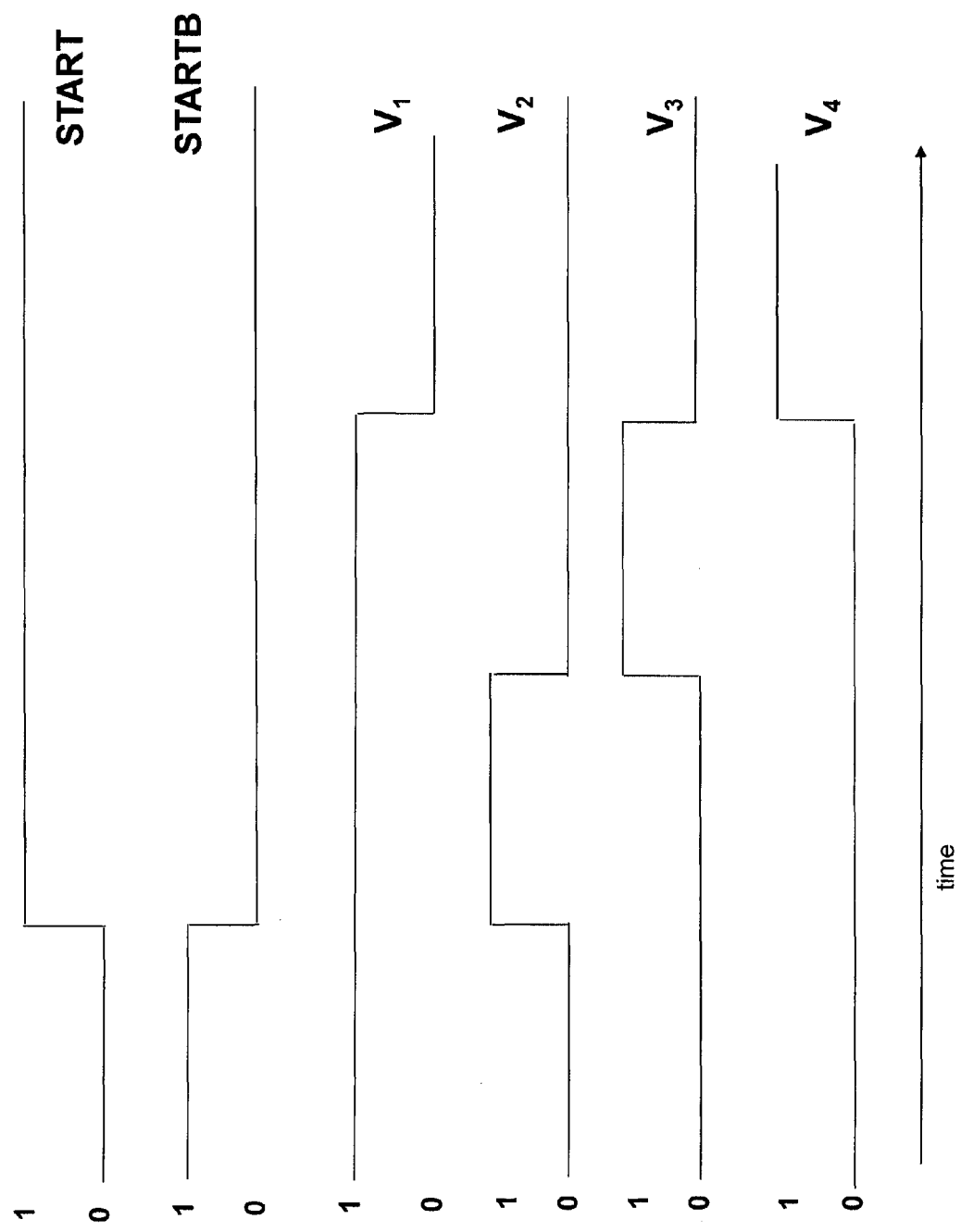
FIG. 16 shows the timing sequence of voltages generated at the write inputs of the array element circuits according to the third embodiment of the invention.

The operation of the circuit is similar to the first embodiment except that the logic signal voltages $V_1$, $V_2$, $V_3$ and $V_4$ which occur at the array element write inputs W for the first to fourth array elements respectively, follow a different sequence, as shown in FIG. 16. This sequence could be used to split a droplet into two separate droplets, or to draw a smaller droplet from a larger droplet "reservoir".

It will be apparent to one skilled in the art that many possible variations to this embodiment could be realised by different arrangements of the logic circuit connectivity. For example circuits can be configured to implement arbitrary hardcoded timing sequences for the write voltages $V_1$, $V_2$, $V_3$ and $V_4$. Timing sequences could thus be devised and designed to implement standard droplet protocols as described in prior art, to perform droplet operations such as splitting, merging and mixing.

An advantage of this embodiment is that droplet operations such as splitting, merging and eluting from a reservoir can be "hard-coded" within a given sequence of array elements dedicated for this purpose. This reduces the complexity of the driver interface required and may also facilitate the required droplet operation being performed more precisely, reliably and quickly than would be the case if all the control signals were generated external to the array.

Figure 17:
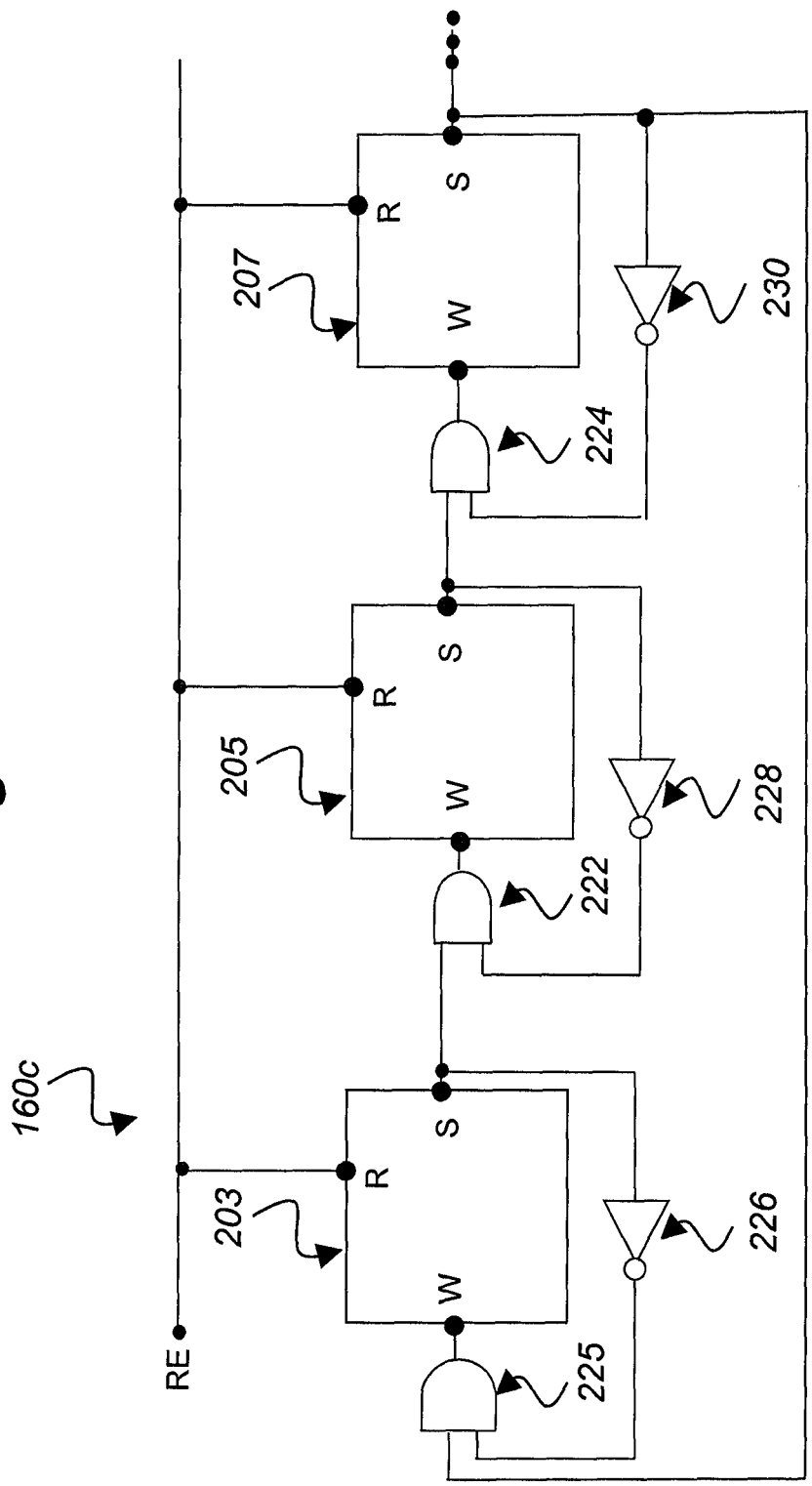
FIG. 17 shows the connectivity of array element circuits within the device according to a fourth embodiment of the invention.

A droplet manipulation circuit 160c in accordance with a fourth embodiment is shown in FIG. 17. As before the control signals A, B, C, D, E and O may be connected as the first embodiment and have been omitted for clarity. This embodiment is as the first embodiment except that an additional input R has been added to each array element circuit to perform a reset function. Accordingly the first array element 203, second array element 205 and third array element 207 are of a different design to 202, 204 and 206 in the embodiments described above, the difference in relevant part being additional reset inputs R connected to a global reset connection RE.

Figure 18:
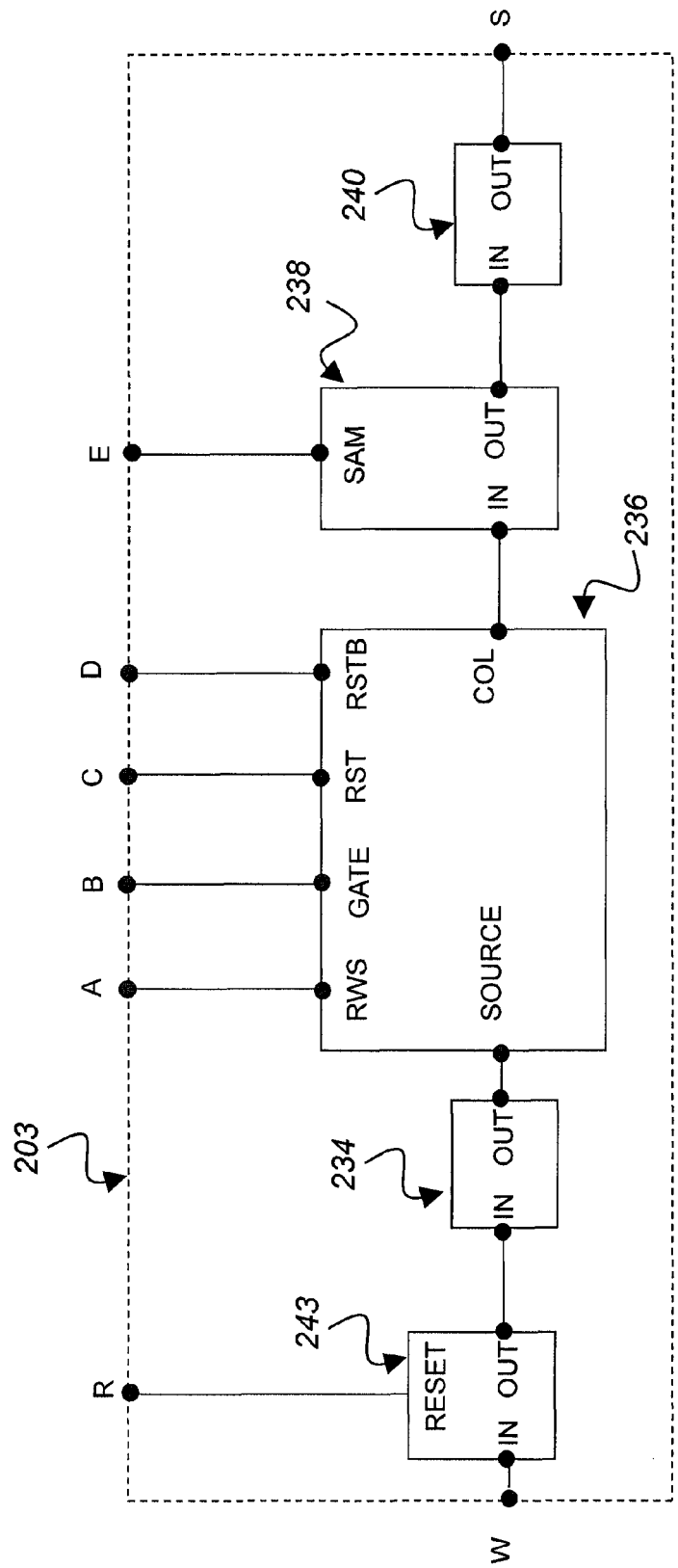
FIG. 18 shows an example implementation of the first array element circuit according to the fourth embodiment of the invention.

FIG. 18 shows a possible design of the modified first array element 203. An additional logic reset circuit 243 has been added between the write input W of 203 and the input IN of the level shifter 234. This additional logic reset circuit 243 has an input IN, an output OUT and a reset input RESET. The logic reset circuit 243 is configured to perform the following functions:

When the reset input R is at logic high level, the output of the logic stage is set to a default level (e.g. logic low) independent of the W input.

When the reset input R is at logic low level, the output of the logic stage is set according to the value at the input W, and operation is for the first embodiment To implement the operations as above, the logic reset circuit 243 could for example be implemented as an AND gate. According to the operation of this embodiment the voltages written to the EW drive electrodes 38 can be reset to a pre-defined value by application of a reset signal. Other implementations are also possible, for example the reset stage could be implemented as a flip-flop of standard means and be controlled by an additional external sampling clock input.

In variants of this embodiment, the design of the logic reset circuit 243 could be different for different array elements. For example, on performing the reset operation, the EW drive electrode 38 of different array elements could be set to different values. For example, the logic reset circuit 243 of different array elements could be implemented with different combinations of AND gates and inverters.

This could be used, for example, to fix the positions of droplets in the array. According to a more complicated arrangement, the logic reset circuit 243 could be designed to produce a pre-defined time sequence of pulses upon activation of the reset. This could be used, for example, to maneuver droplets into fixed positions in the array, or to provide an "override" function whereby the input waveform of pulses written to the EW drive electrode 38 is defined by an externally applied sequence of pulses.

In another variant of this embodiment, the first array element 203 could have multiple reset inputs for performing multiple functions according to the values of the multiple reset inputs.

The advantages of this embodiment are as follows:

Addition of the reset functionality allows droplet positions to be reset to pre-defined locations.

Figure 19:
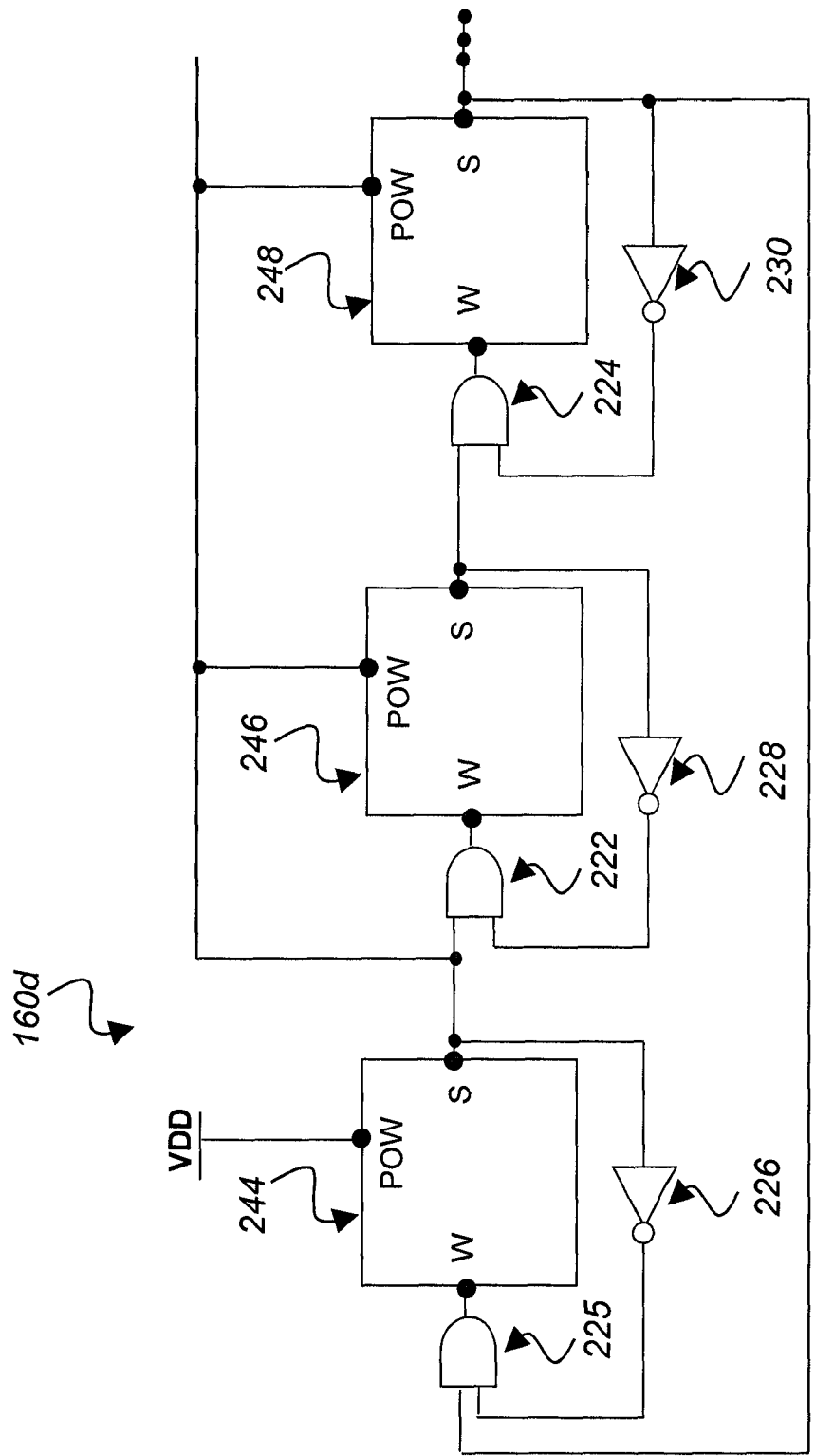
FIG. 19 shows the connectivity of array element circuits within the device according to a fifth embodiment of the invention.

Addition of the reset functionality provides a means for aborting a test sequence or droplet protocol. This could be undertaken, for example, by manual override, or could be performed in response to an unexpected output from the sensor output of an array element Addition of reset and manual over-ride functionality enables the mode of operation to be switchable between automated droplet operations (for example as described in the first three embodiments of the invention) and a manual mode of operation akin to conventional AM-EWOD operation A liquid droplet manipulation circuit 160d according to a fifth embodiment of the invention is shown in FIG. 19. This embodiment is a variant of the first embodiment where the array elements of the droplet manipulation circuit 160 have been provided with additional power-down functionality. The first array element 244 has an additional input POW which is connected to the power supply VDD. The second array element 246 and third array element 248 also have inputs POW that are connected to the first input of AND gate 222. As before the control signals A, B, C, D, E and O have been omitted for clarity.

The second array element 246 and third array element 248 may have an identical, or similar design.

Figure 20:
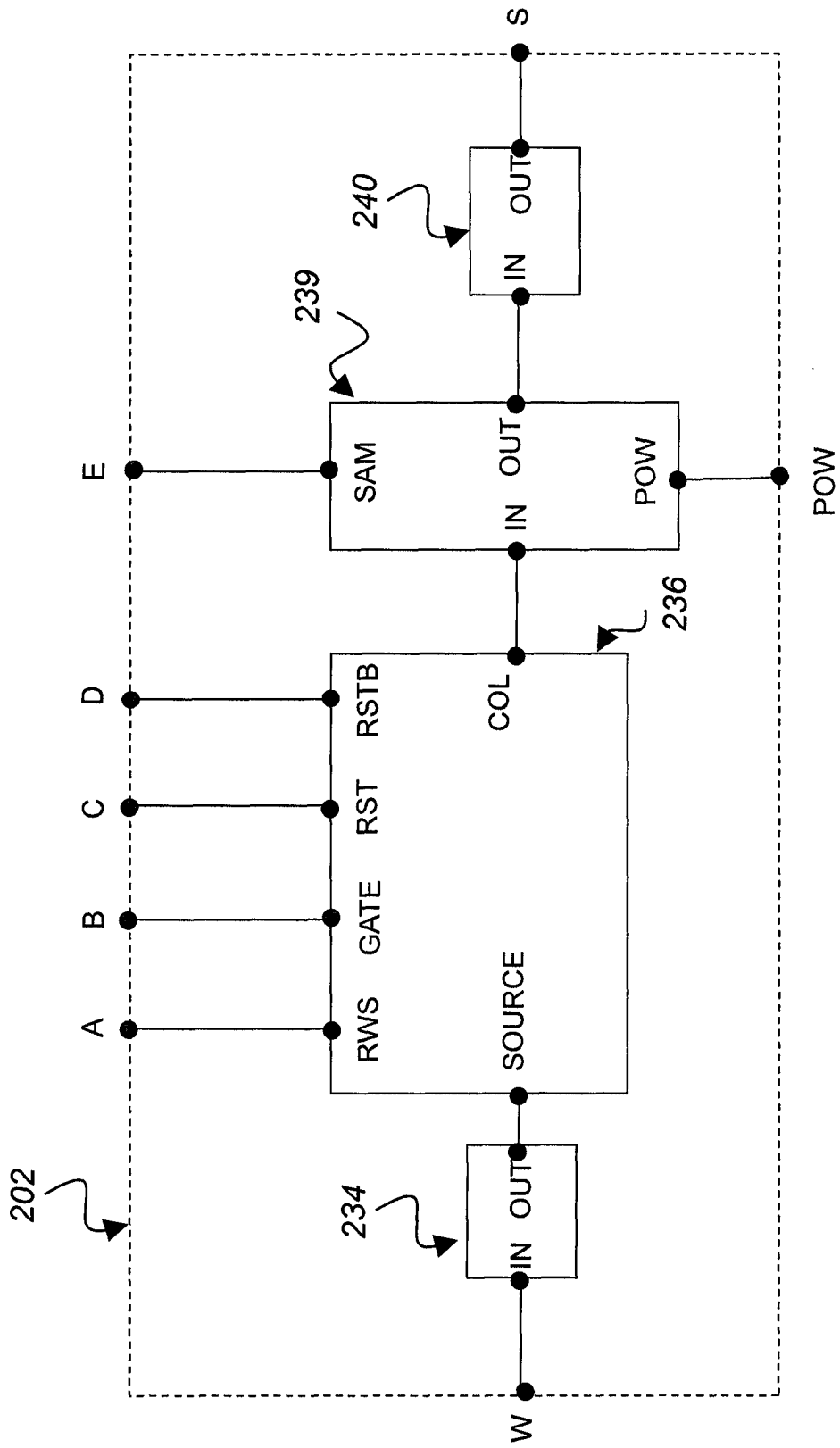
FIG. 20 shows an example implementation of the first array element circuit according to the fifth embodiment of the invention.
Figure 21:
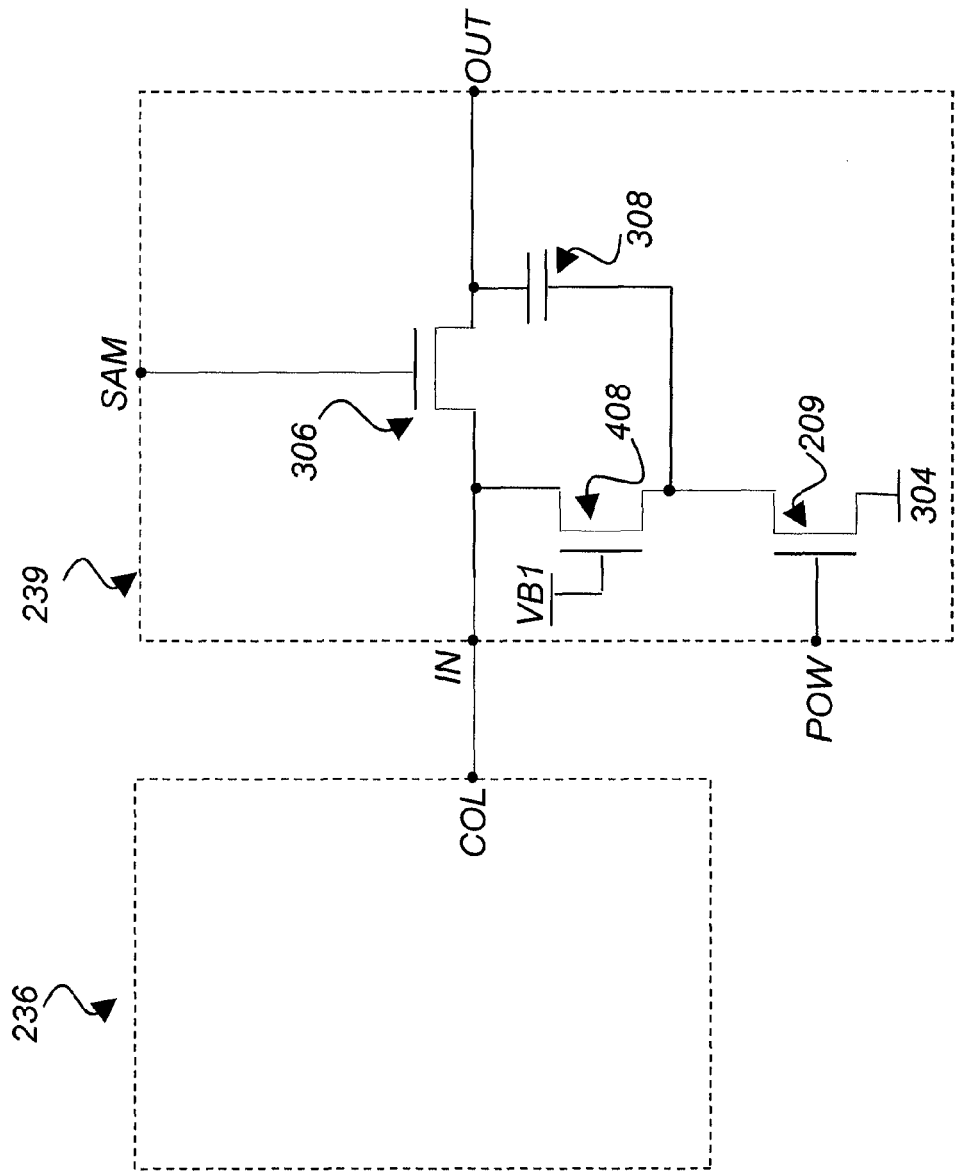
FIG. 21 shows an example implementation of a modified bias and sample circuit according to the fifth embodiment.

FIG. 20 shows a possible implementation of the modified first array element 244 having additional power-down functionality. The array element circuit is as for the first embodiment except that a modified bias and sample circuit 239 is used having the additional input POW to enable power-down functionality. An example design of the modified bias and sample circuit 239 is shown in FIG. 21. This circuit is as previously described except that an additional transistor 209 has been added. The source of transistor 408 is not connected to VSS, but is instead connected to the drain of transistor 209. The source of transistor 209 is connected to VSS. The gate of transistor 209 is connected to the input POW. When the input POW is at logic high level transistor 209 is switched on and the circuit behaves as previously described. When input POW is low the circuit is powered down and there is minimal static current between VDD and VSS. The array element thus has the same functionality as described for the first embodiment, with the additional function that when the logic signal POW is low, the sensor output circuit is switched to a sleep mode whereby it performs no operation and consumes very little power. It will be apparent to one skilled in the art that additional power-down functionality may be added to other circuit components of the array element (e.g. the level shifter 234 and the digitization and latch circuit 240) using standard circuit design techniques in order to further reduce the power consumption of the array element circuit. It will be apparent to one skilled in the art that alternative circuits for performing the same function can also be realised. For example, transistor 408 could be omitted and the input connection to the gate of 408 could be made switch-able between the bias voltage VB1, and a low voltage to turn off 408 and power down the circuit.

According to the operation of this embodiment, the second and third array elements 246,248 have inputs POW and POW that are connected to the sensor output S of the first array element. Thus the second and third array elements 246,248 remain powered down until such a time as a droplet is detected at the first array element 244, at which time the sensor output S of the first array element goes high, and the second and third array elements are powered up.

It will be apparent to one skilled in the art that many variants of this embodiment are possible, employing the basic idea described above that array elements may be powered down until such a time as a droplet is sensed in the near vicinity, at which point the circuits are powered up and become operational.

The advantage of this embodiment is that the power consumption of the AM-EWOD system may be much reduced, since only those parts of the array that are required to be driven and sensed (i.e. at or close to droplet locations) consume significant power.

It will be apparent to one skilled in the art how this embodiment can be combined with any of the previous embodiments.

Figure 22:
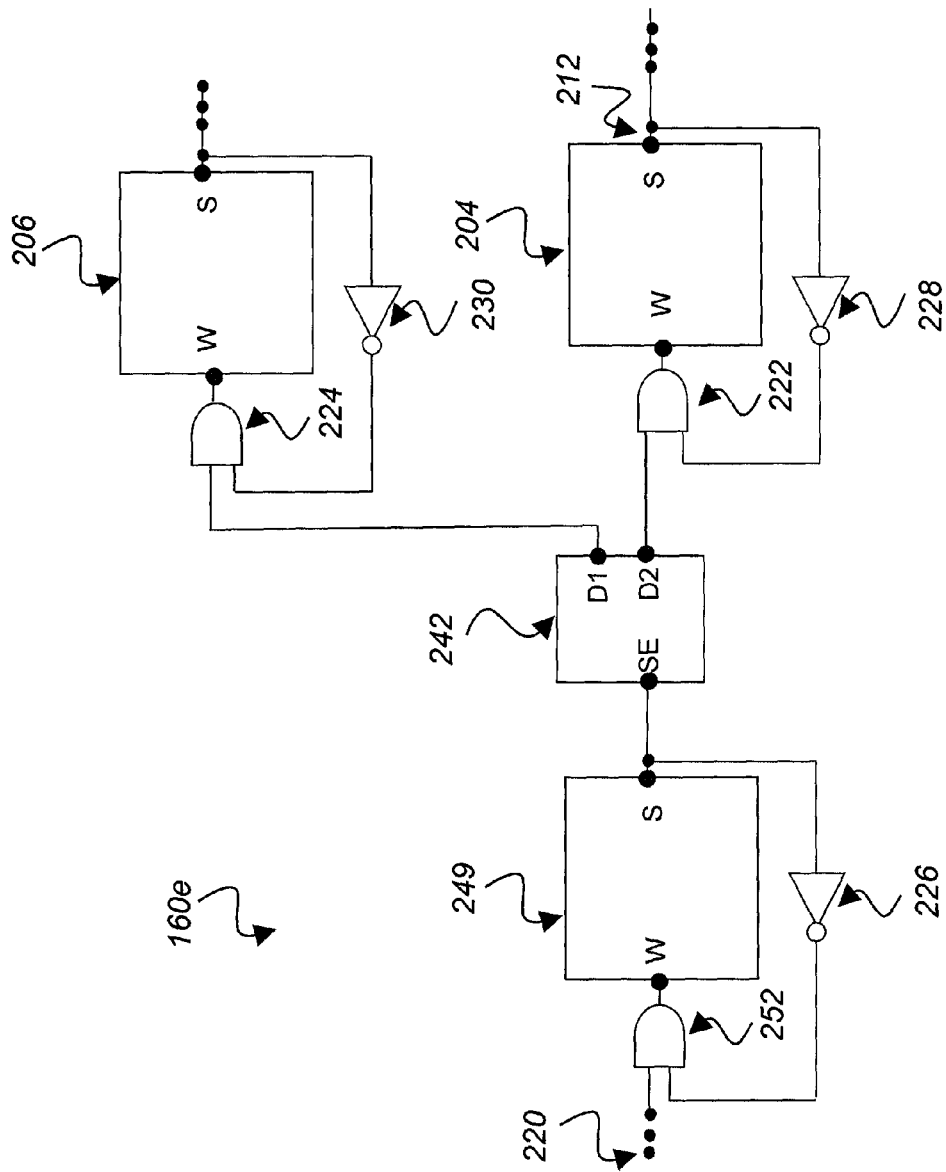
FIG. 22 shows the connectivity of array element circuits within the device according to a sixth embodiment of the invention.

The sixth embodiment of the invention is an AM-EWOD of conventional means and having a droplet manipulation circuit 160e as shown in FIG. 22.

The droplet manipulation circuit 160e includes the following components:
A first array element 249
A second array element 204
A third array element 206
An AND gate 222
An AND gate 224
An AND gate 252
Logical inverters 226, 228 and 230
A sensor data processing circuit 242

The sequence of array elements and logic components may be connected as follows:

The sensor output S of the first array element 249 is connected to the input of an inverter 226 and to the input SE of the sensor data processing circuit 242. The output of inverter 226 is connected to the second input of an AND gate 252. The output of AND gate 252 is connected to the write input W of the first array element 249. The output D1 of the sensor data processing circuit 242 is connected to the first input of AND gate 224. The output D2 of the sensor data processing circuit 242 is connected to the first input of AND gate 222. The output of AND gate 222 is connected to the write input W of the second array element 204. The sensor output S of the second array element 204 is connected to the input of inverter 228. The output of inverter 228 is connected to the second input of AND gate 222. The output of AND gate 224 is connected to the write input W of the third array element 206. The sensor output S of the third array element 206 is connected to the input of inverter 230. The output of inverter 230 is connected to the second input of AND gate 224.

As before the control signals A, B, C, D, E and O have been omitted for clarity and may be connected as shown for the first embodiment.

According to this embodiment there is additionally some means of initially moving the droplet 4 to the location of the first array element 249. This could be achieved, for example, by one or more preceding array elements, for example as described in previous embodiments and denoted in FIG. 22 by three dots 220, denoting an electrical connection to the first input of AND gate 252 used to initialize the operation of this embodiment.

Figure 23:
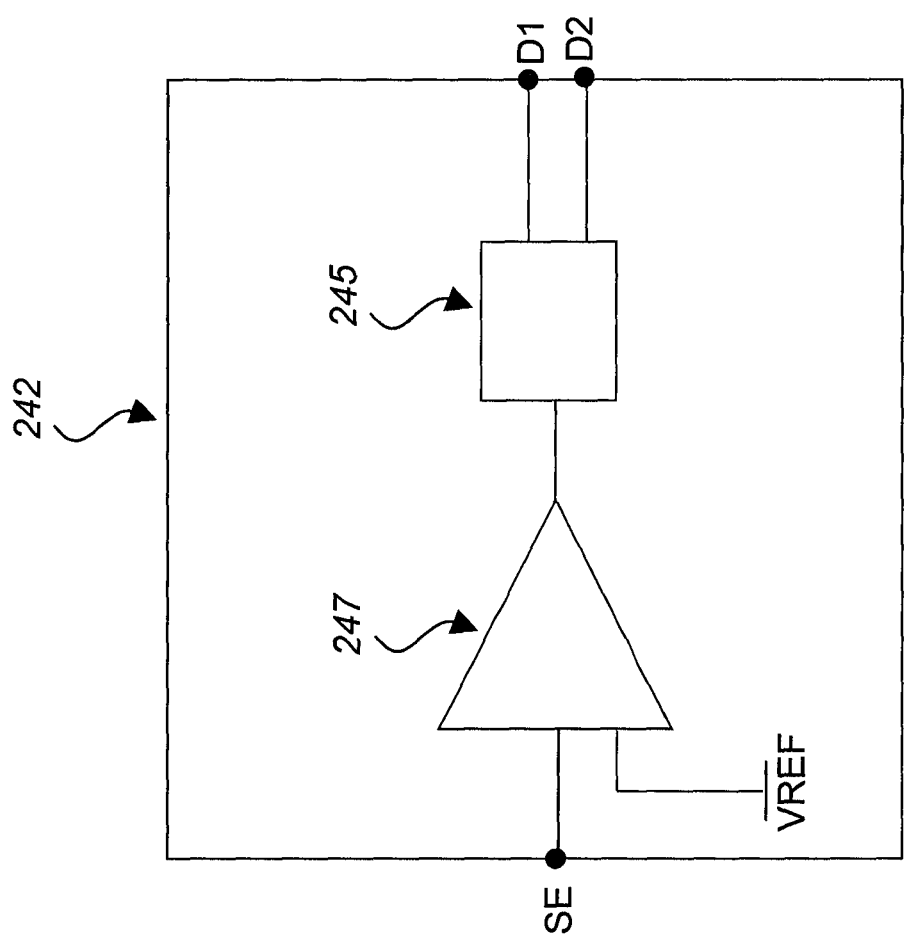
FIG. 23 shows an example implementation of the sensor data processing circuit according to the sixth embodiment of the invention.

FIG. 23 shows a possible implementation of the sensor data processing circuit 242. The circuit contains
A comparator 247, of standard design
A reference voltage signal VREF
A logic circuit 245

The sensor data processing circuit 242 may be connected as follows:

The input SE is connected to the first input of the comparator 247. The reference signal VREF is connected to the second input of the comparator 247. The output of the comparator is connected to the input of the logic circuit 245. The first logic circuit output is the output D1 and the second logic state output is D2. This circuit performs the function of analysing the voltage at the input SE and generating digital output signals at D1 and D2 in accordance with the measured input level. For example, the circuit could be configured so that D1="1" and D2="0" when the input voltage at SE exceeds VREF, and D1="0" and D2="1" otherwise. In this case the logic circuit 245 would be realised simply as a short circuit from the input to D1 and an inverter connected between the input at D2. It will be obvious to one of ordinary skill in the art how other arrangements of logic components could be implemented to realise outputs D1 and D2 that are alternative functions of the input.

Figure 24:
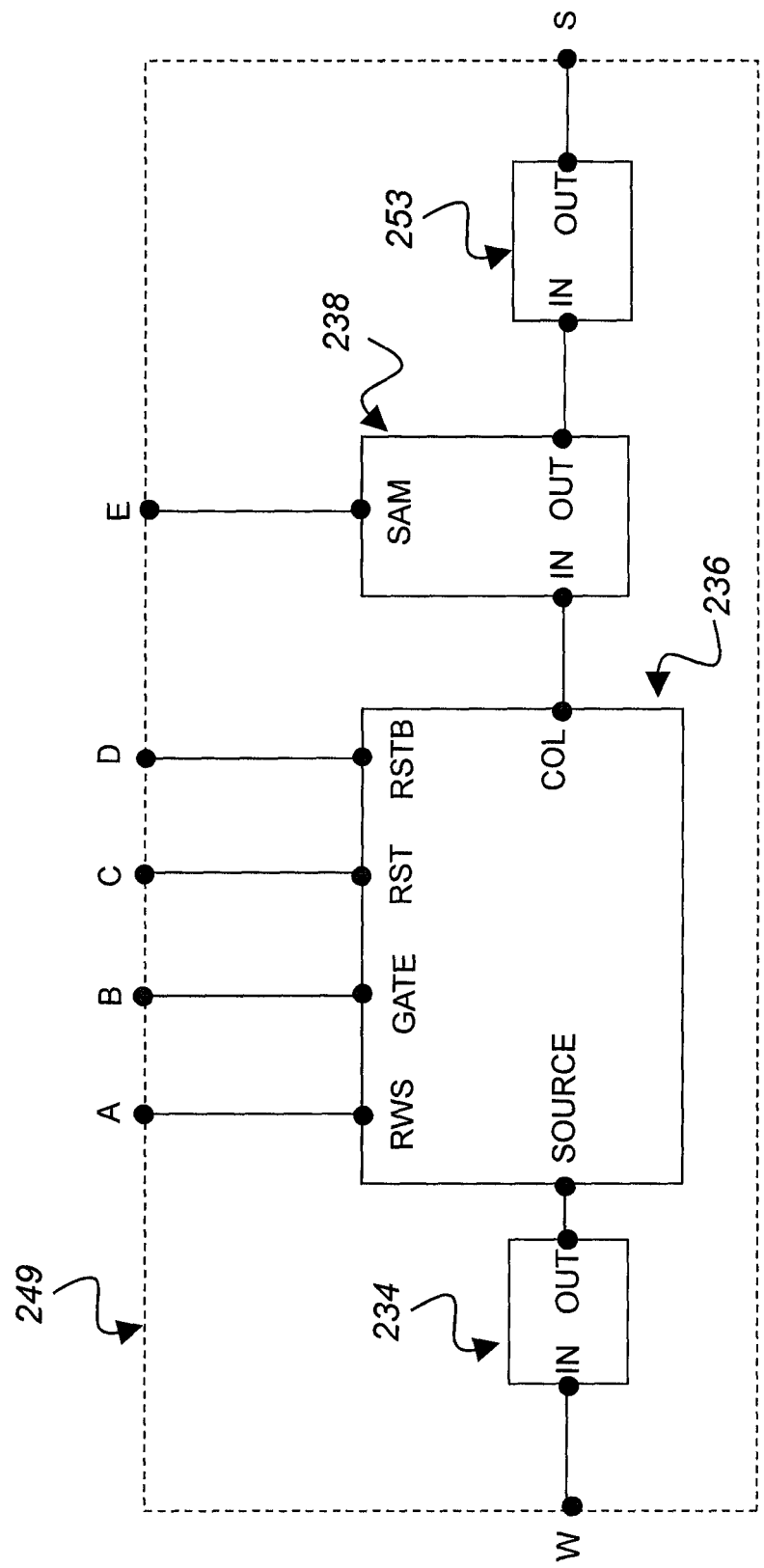
FIG. 24 shows an example implementation of the first array element circuit according to the sixth embodiment of the invention.

The first array element 249 may be of a design as previously described or may have a modified design such that the sensor output S takes the form of an analogue (rather than a digital) signal. An example design is shown in FIG. 24. This circuit is similar to the first array element 202 of the first embodiment, with the difference that the digitization and latch circuit 240 has been replaced by an analogue buffer circuit 253 to create a buffered output OUT of the analogue voltage input IN. The analogue buffer circuit 253 could for example be implemented as a unity gain amplifier. The result is that the sensor output S from 249 is an analogue signal.

In this embodiment the second array element 204 and the third array element 206 may be arranged so that both are spatially adjacent to first array element 249, such that it is possible for a droplet to be transferred from the first array element 249 to either the second array element 204 or the third array element 206, i.e., branch to one or the other, in accordance with the write signals applied to each of the array elements.

According to the operation of this embodiment, the sensor data processing circuit 242 performs a predefined analysis function on the sensed droplet impedance when the droplet 4 is present at the first array element 249. According to the result obtained high level voltage outputs may be applied to D1 or to D2. This results in the circuit having a decision making capability. For example, according to the sensor output S of the first array element 249, the droplet 4 could be transferred to the second array element 204 (in the case where the result of the operation of the sensor data processing circuit 242 is that D1 is low and D2 is high) or to the third array element 206 (in the case where the result of the operation of the sensor data processing circuit 242 is that D2 is low and D1 is high). Alternatively the sensor data processing circuit 242 could be configured in such a way that for certain values of the voltage at the input SE, both D1 and D2 are taken high, thus causing the droplet 4 to split into two sub-droplets.

This circuit may therefore be used to determine the path followed by a droplet through an array, in accordance with a measured sensor function. This embodiment may also be used in performing the whole or a part of a chemical or biochemical test on a droplet, with the result of the sense operation being used to determine further droplet operations.

The advantage of this embodiment is that it provides decision making functionality; the path of a droplet 4 through an AM-EWOD device may be determined locally by "in situ" sensing, processing of sensor data and decision making.

Figure 25:
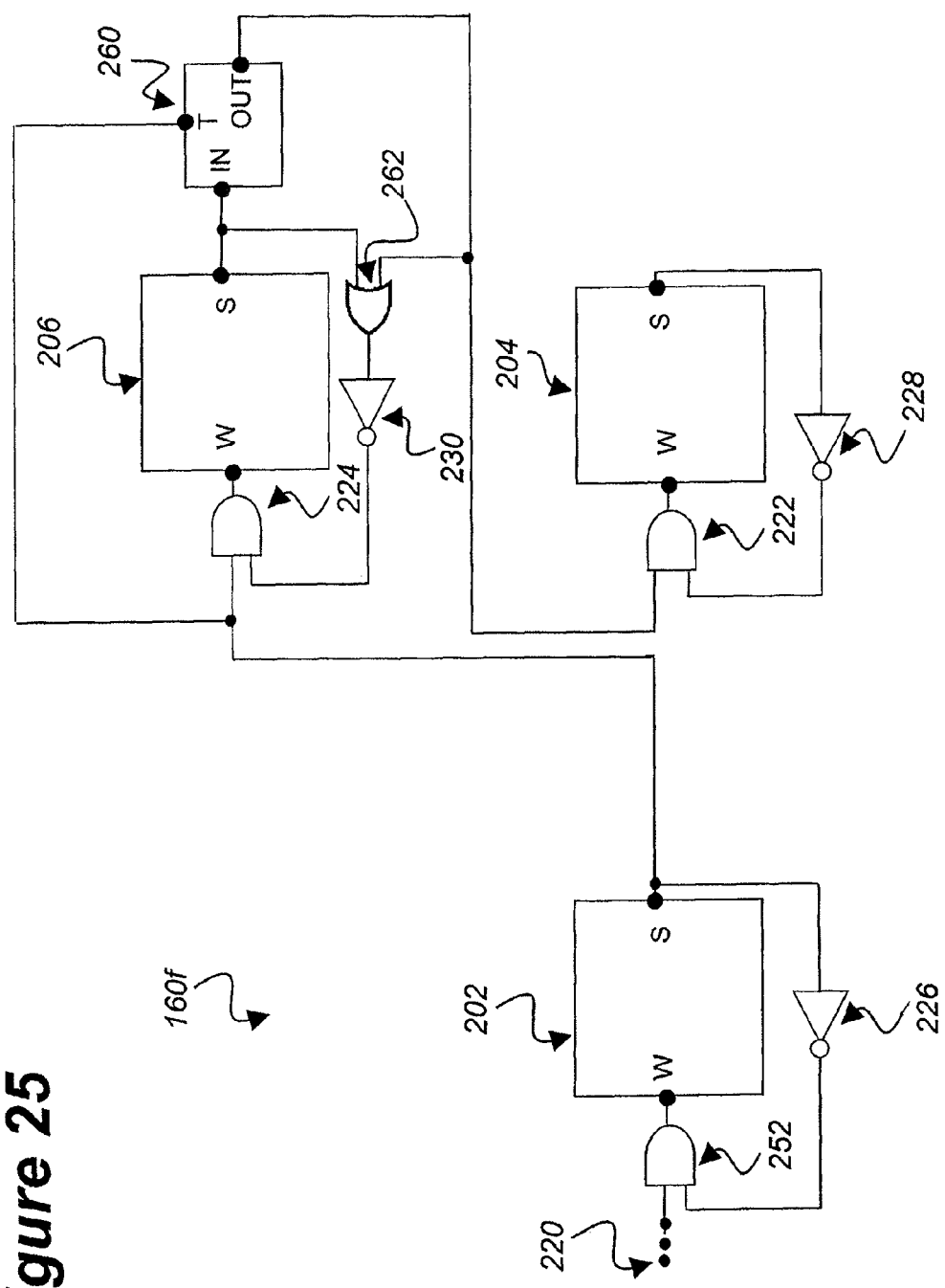
FIG. 25 shows the connectivity of array element circuits within the device according to a seventh embodiment of the invention.

The seventh embodiment of the invention is an AM-EWOD of conventional means and having a droplet manipulation circuit 160f as shown in FIG. 25.

The droplet manipulation circuit 160f includes the following components
A first array element 202
A second array element 204
A third array element 206
AND gate 222
AND gate 224

AND gate 252

Logical inverters 226, 228 and 230

A timer control circuit 260

An OR gate 262

The sequence of array elements and logic components may be connected as follows:

The sensor output S of the first array element 202 is connected to the input of an inverter 226 and to the first input of AND gate 224, and to the timer control input T of the timer control circuit 260. The output of inverter 226 is connected to the second input of AND gate 252. The output of AND gate 252 is connected to the write input W of the first array element 202. The output of AND gate 222 is connected to the write input W of the second array element 204. The sensor output S of the second array element 204 is connected to the input of inverter 228. The output of inverter 228 is connected to the second input of AND gate 222. The output of AND gate 224 is connected to the write input W of the third array element 206. The sensor output S of the third array element 206 is connected to the first input of OR gate 262 and to the input IN of the timer control circuit 260. The output of OR gate 262 is connected to the input of inverter 230. The output of inverter 230 is connected to the second input of AND gate 224. The output OUT of the timer control circuit 260 is connected to the first input of AND gate 222 and the second input of OR gate 262. As before the control signals A, B, C, D, E and O have been omitted for clarity and may be connected as shown for the first embodiment.

According to this embodiment there is additionally some means of initially moving the droplet 4 to the location of the first array element 202. This could be achieved, for example, by one or more preceding array elements, for example as described in previous embodiments and denoted in FIG. 22 by three dots 220, denoting an electrical connection to the first input of AND gate 252 used to initialize the operation of this embodiment.

The timer control circuit 260 may be implemented with standard digital circuit elements (e.g. flip-flops, counters, latches and logic states) to perform the following functions:

When the input T goes high, a timer function is started

If the input IN fails to go high within a defined time $T_0$ of T going high, the output OUT goes high. In all other circumstances the output OUT remains low.

Figure 26:
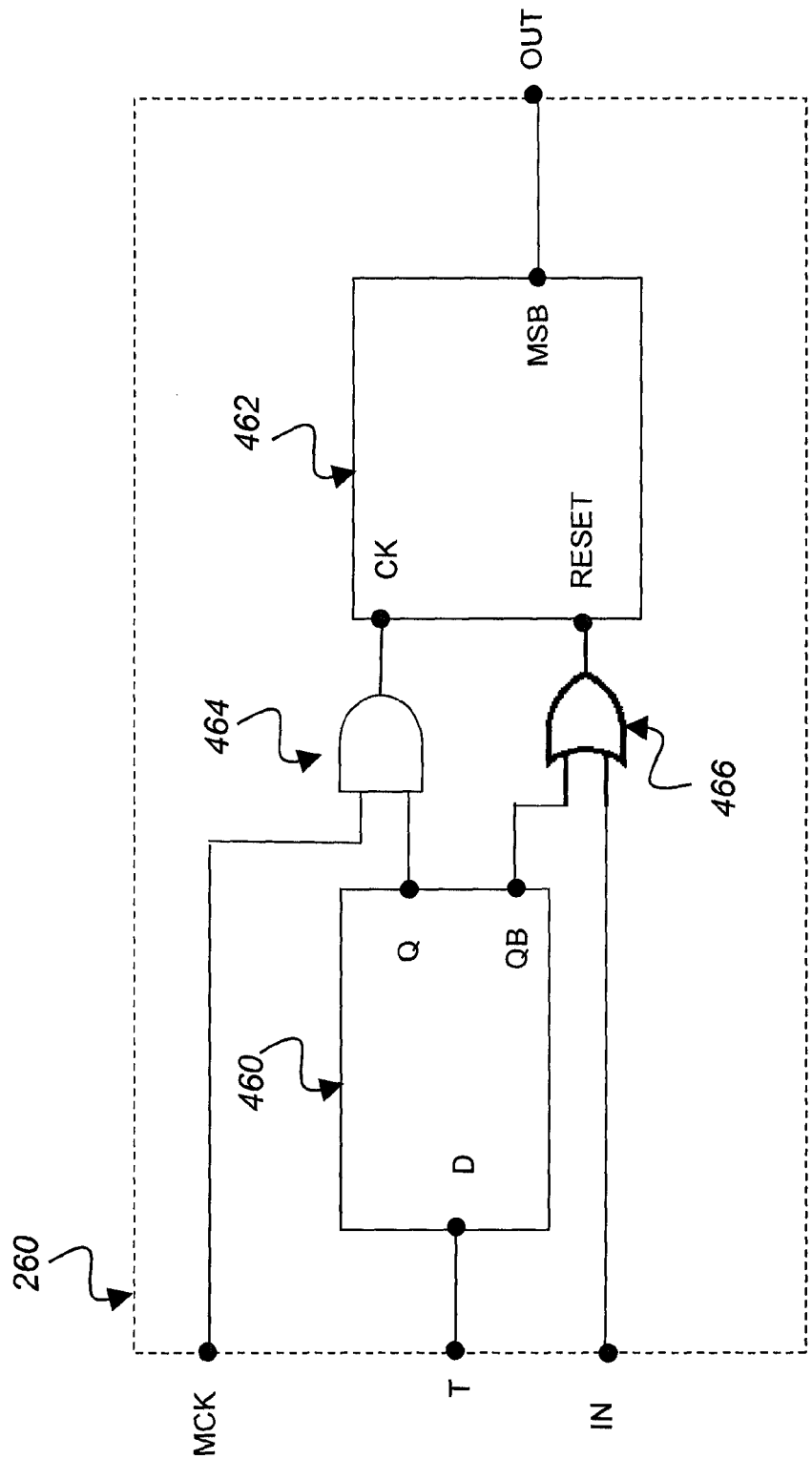
FIG. 26 shows a possible implementation of the timer control circuit according to the seventh embodiment of the invention.

FIG. 26 shows a possible design of such a timer control circuit 260. The circuit contains the following elements:

A flip-flop 460 of standard design

A counter 462 of standard design having an active high reset.

An AND gate 464

An OR gate 466

In addition to the inputs T and IN and the output OUT, the circuit also has an input MCK to which a clock signal is applied.

The input IN is connected to the first input of OR gate 466. The input T is connected to the input of the flip-flop 460. The Q output of the flip-flop 460 is connected to the first input of AND gate 464. The QB (Q-bar) output of the flip-flop is connected to the second input of OR gate 466. The output of the OR gate 466 is connected to the reset input of the counter 462. The MCK input is connected to the second input of AND gate 464. The output of the AND gate 464 is connected to the clock input CK of the counter 462. The most significant bit (MSB) output of the counter is connected to OUT.

According to the operation of this circuit, when the input T goes high the output Q of the flip-flop 460 goes high and is latched. The output reset input of the counter thus goes low (whilst the input IN is low). The output of the AND gate becomes the signal MCK and the counter 462 thus begins to count the number of clock pulses of MCK. In the case where the input IN fails to go high within the number of cycles of MCK required for the MSB output of the counter to become "1" (which may be arranged to be the time $T_0$) the timeout condition is reached and the output of the timer control circuitry becomes "1". In the case where IN goes high within time $T_0$, the output of OR gate 466 becomes 1 and the counter is reset to its initial value. Thus in this case the output OUT remains low. It will be apparent to one skilled in the art that many other implementations of the timer control circuit 260 could alternatively be implemented.

In this embodiment the second array element 204 and the third array element 206 may be arranged so that both are spatially adjacent to first array element 202, such that it is possible for a droplet to be transferred from the first array element 202 to either the second array element 204 or the third array element 206, in accordance with the write signals applied to each of the array elements.

According to the operation of this embodiment, when a droplet is present at the first array element 202, the sensor output S of the first array element 202 goes high. As a result the write input W of the third array element 206 is turned on and the write input W of the first array element 202 will be turned off. The droplet will then transfer from the first array element 202 to the third array element 206. In the case where the droplet fails to perform the transfer operation within the time $T_0$, the output S of the third array element 206 will fail to go high, and the output of the timer control circuit 260 goes high. As a result of this the write input W of the third array element 206 is turned off, and the write input W of the second array element 204 is turned on. The droplet will thus instead transfer from the first array element to the second array element 204.

This embodiment thus describes a means of performing in situ error correction. According to the operation described above it was intended that the droplet should be transferred from array element 202 to array element 206. In the event that this transfer fails to occur within the "timeout" time T0, the droplet is instead transferred to array element 204. Possible errors that may be corrected for using an arrangement of this sort include errors in the electronic circuitry (e.g. due to imperfect manufacturing techniques) or mechanical errors in the structure that may stop a droplet from transferring (e.g. a blemish in the hydrophobic layer of the AM-EWOD).

Figure 27:
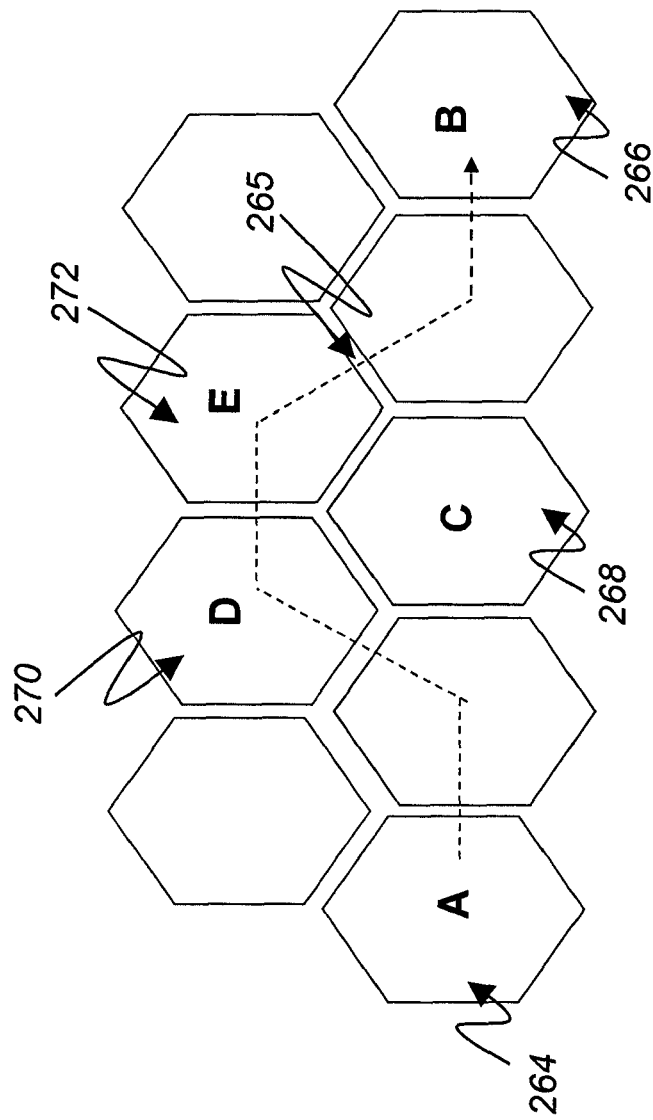
FIG. 27 shows an example route taken by a droplet through an array in the case where an array element is defective, according to the seventh embodiment of the invention.

FIG. 27 shows a possible array element arrangement implementing this embodiment. The array elements may be configured with the intention of transferring a droplet from array element A 264 to array element B 266. In the case where array element C 268 is defective, the droplet may be transferred by an alternative route via array elements D 270 and E 272 as indicated by the arrow 265.

An advantage of this embodiment is that it may improve manufacturing yield since a small proportion of defects may be corrected for by internal reconfiguration of the device as described.

It will be apparent to one skilled in the art how an AM-EWOD array can be realised that implements any combination of the previously described embodiments within the same array. Additionally, it will be appreciable to one skilled in the art how multiple embodiments may be combined within the same array element, for example that the reset functionality of the fourth embodiment may be combined with the power-down functionality of the fifth embodiment in the whole or a part of the array. Similarly embodiments describing the control of droplet operations may be combined in series or in parallel with each other, to effect the control of multiple droplets simultaneously, or of larger droplets which spatially extend over several array elements simultaneously. The present invention contemplates all such combinations.

When arranged in parallel, the droplet operations may be conducted upon droplets encompassing multiple array elements and arranged perpendicular to the direction of motion. Arranged in series a droplet may be moved from a region of the array performing one droplet operation (e.g. eluting from a reservoir) to an region of the array performing a different operation (e.g. merging with another droplet).

Thus a complete system consisting of multiple droplet operations may be implemented using the concept of in-situ feedback to realise the advantages described for the previous embodiments.

The eighth embodiment of this invention is as any of the previous embodiments whereby an alternative means of sensing is used to determine droplet position and/or constituency. Example sensor means could include optical sensing, thermal sensing or any other means of sensing known in prior art. It will be apparent that the invention could also be implemented whereby the outputs of a combination of sensors of different types (e.g. optical sensors and impedance sensors) could be used to provide localised feedback to adjacent array elements according to any of the embodiments previously described.

The ninth embodiment of the invention is as any of the previous embodiments where the action of droplet manipulation is performed by some known means that is not EWOD, for example dielectrophoresis. According to this embodiment, the electronic circuitry associated with the "write" and/or "sense" operations may be modified according to known methods. The embodiment otherwise functions by means similar to as has already been described for previous embodiments and according to the basic concept of the invention that the sensor output is used to determine the write inputs to neighbouring array elements.

It will be further apparent to one skilled in the art that the droplet microfluidic devices of any of the previous embodiments can be configured to perform one or more droplet operations as described in prior art.

It will be further apparent that numerous changes can be made to any of the individual embodiments and to the way in which they are combined within a single AM-EWOD device without departing form the spirit and the scope of the invention.

It will be apparent to one skilled in the art that any of the previous embodiments may be incorporated within a Lab-on-a-Chip system. Within such as system, the droplets sensed and/or manipulated within the droplet microfluidics array could be chemical or biological fluids, e.g. blood, saliva, urine, etc, and that the whole arrangement could be configured to perform a chemical or biological test or to synthesise a chemical or biochemical compound.

Although the invention has been shown and described with respect to a certain embodiment or embodiments, equivalent alterations and modifications may occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

INDUSTRIAL APPLICABILITY

The AM-EWOD device could form a part of a lab-on-a-chip system. Such devices could be used in manipulating, reacting and sensing chemical, biochemical or physiological materials. Applications include healthcare diagnostic testing, chemical or biochemical material synthesis, proteomics, tools for research in life sciences and forensic science.

The invention claimed is:

1. An active matrix device, comprising:
    N array elements arranged spatially in a sequence of first through Nth array elements (where N is an integer $\geq 2$);
    the N array elements each including a write input for receiving a corresponding write input signal which controls operation of the array element, and a sense circuit for sensing a property of the array element and providing a sensor output based on the sensed property; and
        a manipulation circuit including logic circuitry connecting the sensor output from an nth array element in the sequence directly to the write input of an (n+1)th array element and configured to provide the write input signal to the write input of the (n+1)th array element based on the sensor output from the nth array element.

2. The device according to claim 1, wherein each of the array elements is a hydrophobic cell having a surface of which the hydrophobicity is controlled by the application of the corresponding write input signal, and the property sensed by the sense circuits is a property associated with a droplet being present in the respective array element.

3. The device according to claim 2, wherein the property comprises an impedance of the droplet.

4. The device according to claim 2, wherein upon the sensor output of the nth array element indicating the droplet is present in the nth array element, the logic circuitry is configured to provide the write input signal to the (n+1)th array element to change the hydrophobicity of the (n+1)th array element.

5. The device according to claim 4, wherein when the droplet is initially present at the first array element the logic circuitry provides the write input signals to the remaining array elements in the sequence to cause the droplet to move along the sequence of array elements.

6. The device according to claim 5, wherein the logic circuitry is configured to sequentially provide the write input signals to the remaining array element in the sequence so that at any moment in time two or more adjacent array elements are in a state to receive or retain the droplet.

7. The device according to claim 1, wherein the manipulation circuit includes additional logic circuitry connecting the sensor output of the nth array element directly to the write input of the nth array element to return the nth array element to a previous status following a change in the sensor output of the nth array element.

8. The device according to claim 1, wherein the logic circuitry comprises an AND gate and an inverter associated with each of the array elements, the sensor output of an nth array element is connected to a first input of the AND gate associated with an (n+1)th array element and to an input of the inverter associated with the nth array element, and an output of the inverter associated with the (n+1)th array element is connected to a second input of the AND gate associated with the (n+1)th array element.

9. The device according to claim 1, wherein the logic circuitry comprises an AND gate, an OR gate and an inverter associated with each of the array elements, the sensor output of an nth array element is connected to a first input of an OR gate associated with an (n+1)th array element and to a second input of an OR gate associated with the nth array element, an output of the OR gate associated with the nth array element is connected to a first input of the AND gate associated with the nth array element, an input of the inverter associated with the nth array element is connected to the sensor output of the (n+2)th array element, an output of the inverter associated with the nth array element is connected to a second input of the AND gate associated with the nth array element, and an output of the AND gate associated with the nth array element is connected to the write input of the nth array element.

10. The device according to claim 2, wherein the logic circuitry is configured to provide write input signals to the array elements in the sequence to cause a droplet to split among the array elements.

11. The device according to claim 2, wherein the logic circuitry is configured to provide write input signals to the array elements in the sequence to cause droplets amongst the array elements to merge or mix.

12. The device according to claim 2, wherein the logic circuitry is configured to provide write input signals to the array elements in the sequence to cause a droplet to be eluted from a reservoir.

13. The device according to claim 1, wherein the array elements include a reset input for initiating a reset operation.

14. The device according to claim 1, wherein the array elements include a power down input for initiating a low power consumption state.

15. The device according to claim 14, wherein a sensor output of an array element earlier in the sequence is coupled to a power down input of a subsequent array element in the sequence, a change in the sensor output of the array element earlier in the sequence causing the subsequent array element in the sequence to awake from the low power consumption state.

16. The device according to claim 1, further comprising an additional array element spatially adjacent an nth array element in the sequence, and the manipulating circuit including additional logic circuitry configured to selectively provide write input signals to the (n+1)th array element and the additional array element in accordance with a predefined analysis function.

17. The device according to claim 16, wherein the additional logic circuitry comprises a timer control circuit and the predefined analysis function incorporates a timeout condition.

18. The device according to claim 1, wherein at least the first array element comprises an initialization circuit to initialize the write input of the first array element.

19. The device according to claim 1, wherein the sense circuit utilizes at least one of impedance sensing, optical sensing or thermal sensing to sense the property of the array element.

20. The device according to claim 2, comprising multiple sets of the N array elements each including a corresponding manipulation circuit.

21. The device according to claim 20, wherein the multiple sets of N array elements are arranged to effect control of multiple droplets simultaneously.

22. The device according to claim 20, wherein the multiple sets of N array elements are arranged to effect control of a droplet which spatially extends over multiple array elements simultaneously.

23. The device according to claim 20, wherein the multiple sets of N array elements are arranged to effect control of a droplet in series.

* * * * *